US010624008B2

(12) United States Patent
Takeuchi et al.

(10) Patent No.: US 10,624,008 B2
(45) Date of Patent: Apr. 14, 2020

(54) DETERMINATION OF WAVEFORM SOFTWARE CORRESPONDING TO NARROWEST BANDWIDTH AT FREQUENCY WITHIN RANGE OF FREQUENCIES IN WHICH FIELD INTENSITY IS BELOW THRESHOLD

(71) Applicant: NEC Corporation, Minato-ku, Tokyo (JP)

(72) Inventors: Takashi Takeuchi, Tokyo (JP); Hideki Watanabe, Tokyo (JP); Atsushi Honda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/512,165

(22) PCT Filed: Oct. 9, 2015

(86) PCT No.: PCT/JP2015/005129
§ 371 (c)(1),
(2) Date: Mar. 17, 2017

(87) PCT Pub. No.: WO2016/059783
PCT Pub. Date: Apr. 21, 2016

(65) Prior Publication Data
US 2017/0289884 A1 Oct. 5, 2017

(30) Foreign Application Priority Data
Oct. 16, 2014 (JP) ................. 2014-211705

(51) Int. Cl.
*H04W 36/14* (2009.01)
*H04W 88/02* (2009.01)
(Continued)

(52) U.S. Cl.
CPC ............ *H04W 36/14* (2013.01); *H04W 8/24* (2013.01); *H04W 8/245* (2013.01); *H04W 36/30* (2013.01); *H04W 88/02* (2013.01); *H04W 92/18* (2013.01)

(58) Field of Classification Search
CPC ... H04W 76/023; H04W 92/18; H04W 84/18; H04W 36/14; H04W 8/24; H04W 36/30; H04W 8/245; H04W 88/02
See application file for complete search history.

(56) References Cited

U.S. PATENT DOCUMENTS

2006/0155827 A1    7/2006  Prehofer et al.
2007/0258423 A1*  11/2007  Kulkarni ............... H04W 88/04
                                              370/338

(Continued)

FOREIGN PATENT DOCUMENTS

EP         1858198 A1      11/2007
JP       2005-536934 A     12/2005
(Continued)

OTHER PUBLICATIONS

International Search Report for PCT Application No. PCT/JP2015/005129, dated Dec. 8, 2015.

(Continued)

*Primary Examiner* — Nam T Huynh

(57) ABSTRACT

If any waveform software to be used is determined without taking into account the status of the other end of communication, the communication with the other end may possibly fail. Each of a plurality of radio devices observes its status, which dynamically varies in relation to that radio device, and transmits observation data, i.e., data representative of the observed status to a server apparatus. The server apparatus receives the observation data transmitted from the radio devices. Further, the server apparatus determines, on the basis of the observation data received from the radio devices, waveform software to be used for communications between or among the radio devices, and transmits the determined waveform software to the radio devices. Each of the radio devices receives the waveform software transmit- (Continued)

ted from the server apparatus and uses the received waveform software to control its own software radio communication means.

11 Claims, 22 Drawing Sheets

(51) Int. Cl.
*H04W 8/24* (2009.01)
*H04W 36/30* (2009.01)
*H04W 92/18* (2009.01)

(56) References Cited

U.S. PATENT DOCUMENTS

| | | | |
|---|---|---|---|
| 2009/0082000 A1 | 3/2009 | Nakano et al. | |
| 2011/0269494 A1 | 11/2011 | Kobayashi | |
| 2015/0009915 A1* | 1/2015 | Baek | H04W 76/023 370/329 |
| 2015/0094064 A1* | 4/2015 | Lei | H04W 76/023 455/436 |
| 2017/0195952 A1* | 7/2017 | Huang | H04W 52/0206 |

FOREIGN PATENT DOCUMENTS

| | | |
|---|---|---|
| JP | 2008-236342 A | 10/2008 |
| JP | 2008-245031 A | 10/2008 |
| JP | 2010-278973 A | 12/2010 |
| JP | 2011-234289 A | 11/2011 |
| JP | 5032930 B2 | 7/2012 |

OTHER PUBLICATIONS

English translation of Written opinion for PCT Application No. PCT/JP2015/005129.
Japanese Office Action for JP Application No. 2016-553966 dated Mar. 6, 2018 with English Translation.

\* cited by examiner

OBSERVATION DATA

OBSERVATION DATA

Fig.16

| WAVEFORM SOFTWARE | COMMUNICATION METHOD | FREQUENCY[MHz] | BANDWIDTH[Hz] |
|---|---|---|---|
| WAVEFORM SOFTWARE AA | FM SYSTEM A | 400.15 | 25 k |
| WAVEFORM SOFTWARE DA | DIGITAL SYSTEM A | 400.15 | 12.5 k |
| WAVEFORM SOFTWARE DB | DIGITAL SYSTEM B | 400.15 | 6.25 k |
| ... | ... | ... | ... |

Fig.17

| WAVEFORM SOFTWARE | COMMUNICATION METHOD | FREQUENCY [MHz] | BANDWIDTH [Hz] | MULTIPLEXING DEGREE | NUMBER OF EMPTY COMMUNICATION CHANNELS |
|---|---|---|---|---|---|
| WAVEFORM SOFTWARE A | DIGITAL SYSTEM A | 400.35 | 12.5 k | 1 | 1 |
| WAVEFORM SOFTWARE B | DIGITAL SYSTEM B | 400.35 | 6.25 k | 1 | 1 |
| WAVEFORM SOFTWARE C | DIGITAL SYSTEM C | 400.35 | 12.5 k | 4 | 1 |

Fig.18

| SERVICE TYPE | TRANSMISSION RATE [bps] |
|---|---|
| AUDIO TRANSMISSION | 9.6 k |
| STILL IMAGE TRANSMISSION | 384 k |
| MOVING IMAGE TRANSMISSION | 2.4 M |
| ⋮ | ⋮ |

Fig.19

| WAVEFORM SOFTWARE | COMMUNICATION METHOD | FREQUENCY [MHz] | TRANSMISSION RATE [bps] | BANDWIDTH [Hz] |
|---|---|---|---|---|
| WAVEFORM SOFTWARE A | DIGITAL SYSTEM A | 401.0 | 9.6 k | 12.5 k |
| WAVEFORM SOFTWARE B | DIGITAL SYSTEM B | 700.8 | 2 M | 1.4 M |
| WAVEFORM SOFTWARE C | DIGITAL SYSTEM C | 1145.4 | 50 M | 20 M |
| ... | ... | ... | ... | ... |

Fig.20A

| RESOURCE/INDEX | REMAINING AMOUNT/EXTRA MARGIN |
|---|---|
| CPU | 100 |
| DSP | 20 |
| MEMORY | 16MB |
| STORAGE | 4GB |
| BATTERY | 6 HOURS |
| TEMPERATURE | 10°C |

OBSERVATION DATA

Fig.20B

| RESOURCE/INDEX | REMAINING AMOUNT/EXTRA MARGIN |
|---|---|
| CPU | 60 |
| DSP | 10 |
| MEMORY | 8MB |
| STORAGE | 16MB |
| BATTERY | 1 HOUR |
| TEMPERATURE | 1°C |

OBSERVATION DATA

Fig.21

| WAVEFORM SOFTWARE | REQUIREMENT | | | |
|---|---|---|---|---|
| | CPU | DSP | MEMORY | STORAGE |
| WAVEFORM SOFTWARE A | 120 | 40 | 128MB | 256MB |
| WAVEFORM SOFTWARE B | 80 | 10 | 16MB | 32MB |
| WAVEFORM SOFTWARE C | 40 | 4 | 1MB | 2MB |

DETERMINATION OF WAVEFORM SOFTWARE CORRESPONDING TO NARROWEST BANDWIDTH AT FREQUENCY WITHIN RANGE OF FREQUENCIES IN WHICH FIELD INTENSITY IS BELOW THRESHOLD

TECHNICAL FIELD

The present invention relates to a radio communication system, a radio communication method, a server apparatus, and a recording medium, in particular to a radio communication system, a radio communication method, a server apparatus, and a recording medium which switch networks by means of software.

BACKGROUND ART

One technique for switching, by means of software, radio networks to be a connection destination is software defined radio. In the following, the software defined radio is referred to as software defined radio, and a radio device making use of the software defined radio is referred to as a software defined radio device.

The software defined radio is a technique to make the corresponding radio device cope with various radio communication systems by only changing the software operated on that radio device. The software defined radio has such an advantageous effect of enabling a single radio device to connect to various radio networks without changing the hardware. As follows, software operating on this software defined radio device and defining the radio communication method is referred to as waveform software. To which radio communication method, a software defined radio device corresponds is determined in accordance with the content described in the waveform software.

The following patent literatures describe exemplary systems switching the radio communication methods, i.e., switching radio networks, by applying the software defined radio.

In handover (switch) between communication areas of different communication methods from each other, in the system described in PTL 1, a base station radio device that corresponds to a first communication method receives, from a mobile station radio device, a signal representing a radio quality of a signal received from the base station radio device, and downloads waveform software of a second communication method in the mobile station radio device according to a first condition of the received signal representing the radio quality. Then, the base station radio device corresponding to the first communication method handovers the mobile station radio device to the base station radio device which corresponds to the second communication method according to a second condition of the radio quality.

In PTL 2, the radio communication terminal that can switch the plurality of radio communication methods by means of software defined radio monitors, for each radio communication method, the carrier interference and noise power ratio: CINR, received signal strength indictor: RSSI, the state of the consumption power of the radio apparatus and the like, and based on the QoS (quality of service) required in communication and the monitoring result, determines the priority order of the plurality of radio communication methods. The radio communication method to be used, i.e., the waveform software to be used, is changed according to this priority order.

The communication system described in PTL 3 is such that, in a radio communication system constituted by a plurality of software defined radio devices and an update server storing therein a waveform application, each software defined radio device selects and executes an executable component from among the waveform software components downloaded from the update server, based on the profile representing its hardware specification.

The software defined radio terminal described in PTL 4, when being changed to a specific communication method using a reconfigurable radio circuit, calculates the temperature value of the reconfigurable radio circuit as state information, transmits, to a terminal management apparatus, the specific communication method identification information, its own terminal identification information, and the state information, as setting parameter detection condition, receives a setting parameter matching the setting parameter detection condition from the terminal management apparatus and sets the setting parameter to each circuit, and switches the communication methods, i.e., changes the waveform software to be used.

The multi-link communication apparatus described in PTL 5 determines the number of available radio communication systems and radio links based on the base station information, the service requirement conditions, and the terminal information, and performs multi-link communication with the multi-link terminal via the base station.

CITATION LIST

Patent Literature

[PTL 1]: Japanese Unexamined Patent Application Publication No. 2011-234289
[PTL 2]: Japanese Unexamined Patent Application Publication No. 2010-278973
[PTL 3]: Japanese Patent No. 5032930
[PTL 4]: Japanese Unexamined Patent Application Publication No. 2008-236342
[PTL 5]: Japanese Unexamined Patent Application Publication No. 2008-245031

SUMMARY OF INVENTION

Technical Problem

Each of the above-mentioned radio communication systems in PTLs 1-5 that switches communication methods by means of software determines waveform software to be used, without considering the state of a counterpart of the communication.

To be more specific, in the system described in PTL 1, the first base station apparatus transmits, to a mobile station radio device, waveform software corresponding to the second communication method, without considering the state of the cover area of the second base station apparatus being the communication counterpart after the handover of the mobile station radio device, such as a radio wave environment.

Regarding the terminal described in PTL 2, the radio communication terminal measures the radio wave environment surrounding the terminal itself and determines the priority order of the radio communication method, thereby switching the radio communication method, i.e., waveform software, and does not consider the radio wave environment of the radio device being the counterpart.

In the communication system described in PTL 3, each software defined radio device selects the waveform software component based on its own hardware specification, in which the state of the hardware specification or the like of the other software defined radio device, being the communication counterpart, is not taken into consideration.

In the software defined radio device described in PTL 4, the communication method, i.e., waveform software is changed by setting a parameter to each circuit of the software defined radio device based on the temperature of the terminal itself, in which the state of temperature or the like of the other software defined radio device, being the communication counterpart, is not taken into consideration.

In the multi-link communication apparatus described in PTL 5, the number of available radio communication systems and radio links is determined based on the base station information, the service requirement conditions, and the terminal information between the multi-link communication apparatus and the multi-link terminal, which does not take into consideration the communication with other multi-link terminals.

If the waveform software to be used is determined without considering the state of the communication counterpart in the above manners, communication may not be performed properly depending on the state of the communication counterpart.

OBJECT OF THE INVENTION

An object of the present invention is to provide a radio communication system that solves the above-mentioned problem, i.e., the problem that if the waveform software to be used is determined without considering the state of the communication counterpart, communication with the communication counterpart may fail.

Solution to Problem

A radio communication system according to an exemplary aspect of the present invention includes a plurality of radio devices and a server apparatus, where each of the radio devices includes: an observing means for observing a dynamically changing state regarding itself; an observation data transmitting means for transmitting, to the server apparatus, observation data which is data representing the observed state; a waveform software receiving means for receiving the waveform software transmitted from the server apparatus; and a software defined radio communication means controlled by the received waveform software, and where the server apparatus includes: an observation data receiving means for receiving the observation data transmitted from the radio device; a waveform software determining means for determining the waveform software to be used in communication between the plurality of radio devices based on the observation data received from the plurality of radio devices; and a waveform software transmitting means for transmitting the determined waveform software to the plurality of radio devices.

A radio communication method according to another exemplary aspect of the present invention, is a radio communication method performed by a radio communication system including a plurality of radio devices and a server apparatus, and the radio communication method includes: each of the radio devices observing a dynamically changing state regarding itself, and transmitting, to the server apparatus, observation data which is data representing the observed state, the server apparatus receiving the observation data transmitted from the radio device, determining waveform software to be used in communication between the plurality of radio devices based on the observation data received from the plurality of radio devices, and transmitting the determined waveform software to the plurality of radio devices, and each of the radio devices receiving the waveform software transmitted from the server apparatus, and controlling a software defined radio communication means of itself by means of the received waveform software.

A server apparatus according to still another exemplary aspect of the present invention is a server connected to a plurality of radio devices, and the server apparatus includes: an observation data receiving means for receiving observation data which represents a dynamically changing state regarding the radio devices and transmitted from the radio devices; a waveform software determining means for determining waveform software to be used in communication between the plurality of radio devices based on the observation data received from the plurality of radio devices; and a waveform software transmitting means for transmitting the determined waveform software to the plurality of radio devices.

A storage medium according to still another exemplary aspect of the present invention is a non-transitory computer-readable storage medium storing a program that causes a computer connected to a plurality of radio devices to function as: an observation data receiving means for receiving observation data which represents a dynamically changing state regarding the radio devices and transmitted from the radio devices; a waveform software determining means for determining waveform software to be used in communication between the plurality of radio devices based on the observation data received from the plurality of radio devices; and a waveform software transmitting means for transmitting the determined waveform software to the plurality of radio devices.

Advantageous Effect of Invention

According to the above-described exemplary aspect of the present invention, by including such a configuration, it becomes possible to determine the waveform software used for communication among a plurality of radio devices, by considering the states of the plurality of radio devices, which allows communication among the plurality of radio devices without trouble.

BRIEF DESCRIPTION OF DRAWINGS

FIG. 16 is a diagram illustrating an example of a library included in a waveform software determining section of the server according to the sixth exemplary embodiment of the present invention.

FIG. 17 is a diagram illustrating an example of a library included in a waveform software determining section of the server according to the seventh exemplary embodiment of the present invention.

FIG. 18 is a diagram illustrating an example of a table representing correspondence between service types and transmission rates which is included in a server according to the eighth exemplary embodiment of the present invention.

FIG. 19 is a diagram illustrating an example of a library included in a waveform software determining section of the server according to the eighth exemplary embodiment of the present invention.

FIG. 20A is a diagram illustrating a specific example of data observed in a software defined radio device 61 according to the ninth exemplary embodiment of the present invention.

FIG. 20B is a diagram illustrating a specific example of data observed in a software defined radio device 62 according to the ninth exemplary embodiment of the present invention.

FIG. 21 is a diagram illustrating an example of a library included in a waveform software determining section of a server according to the ninth exemplary embodiment of the present invention.

DESCRIPTION OF EMBODIMENTS

First Exemplary Embodiment

Figure 1:
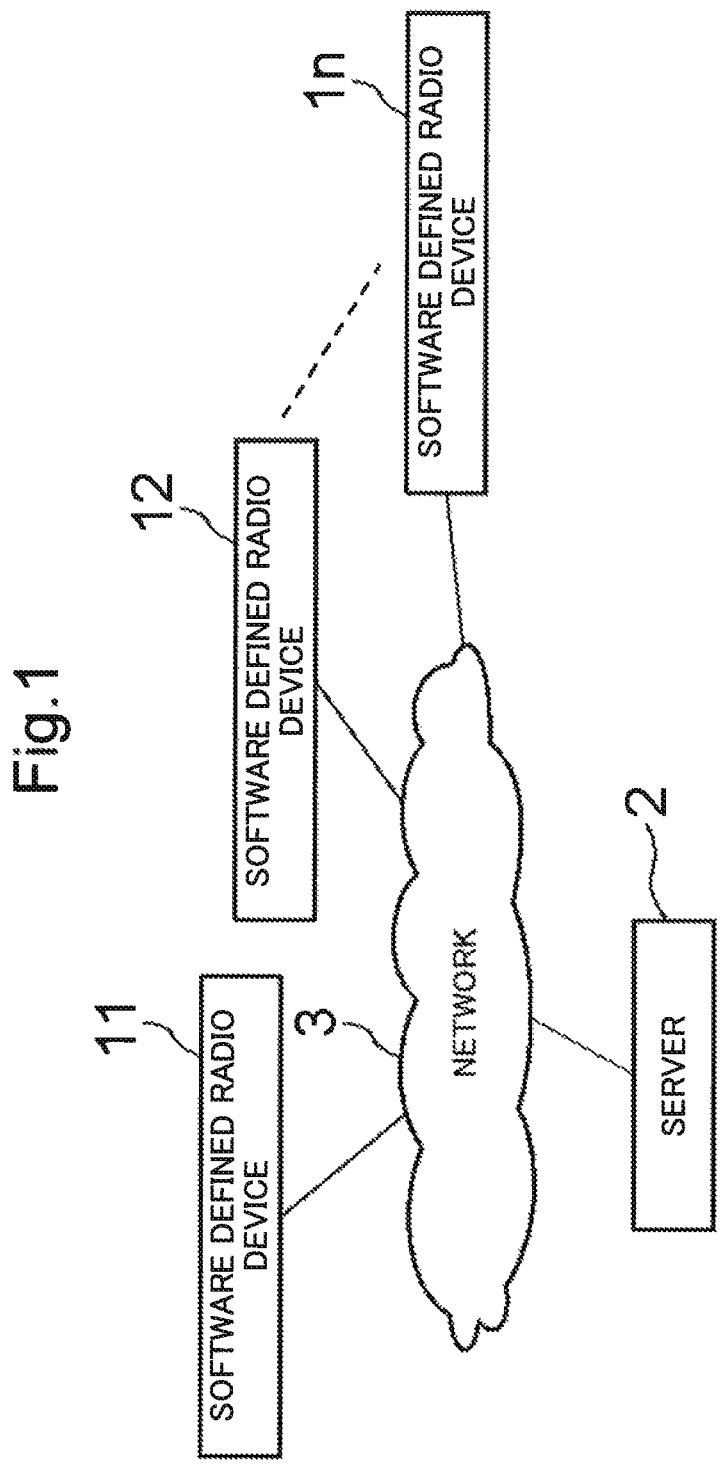
FIG. 1 is a block diagram of a radio communication system according to a first exemplary embodiment of the present invention.

FIG. 1 is a block diagram illustrating an example of a radio communication system according to the first exemplary embodiment of the present invention. The radio communication system according to the present exemplary embodiment is constituted by two or more software defined radio devices 11-1n, a server apparatus 2 (hereinafter simply referred to as "server"), and a network 3.

The software defined radio devices 11-1n are software defined radio devices, and unless otherwise particularly explained, they are referred to as "software defined radio device 1" since they have a similar configuration. The software defined radio device 1 transmits, to a server 2, observation data, and receives waveform software, and therefore is desirably always connected to a network 3.

Figure 2:
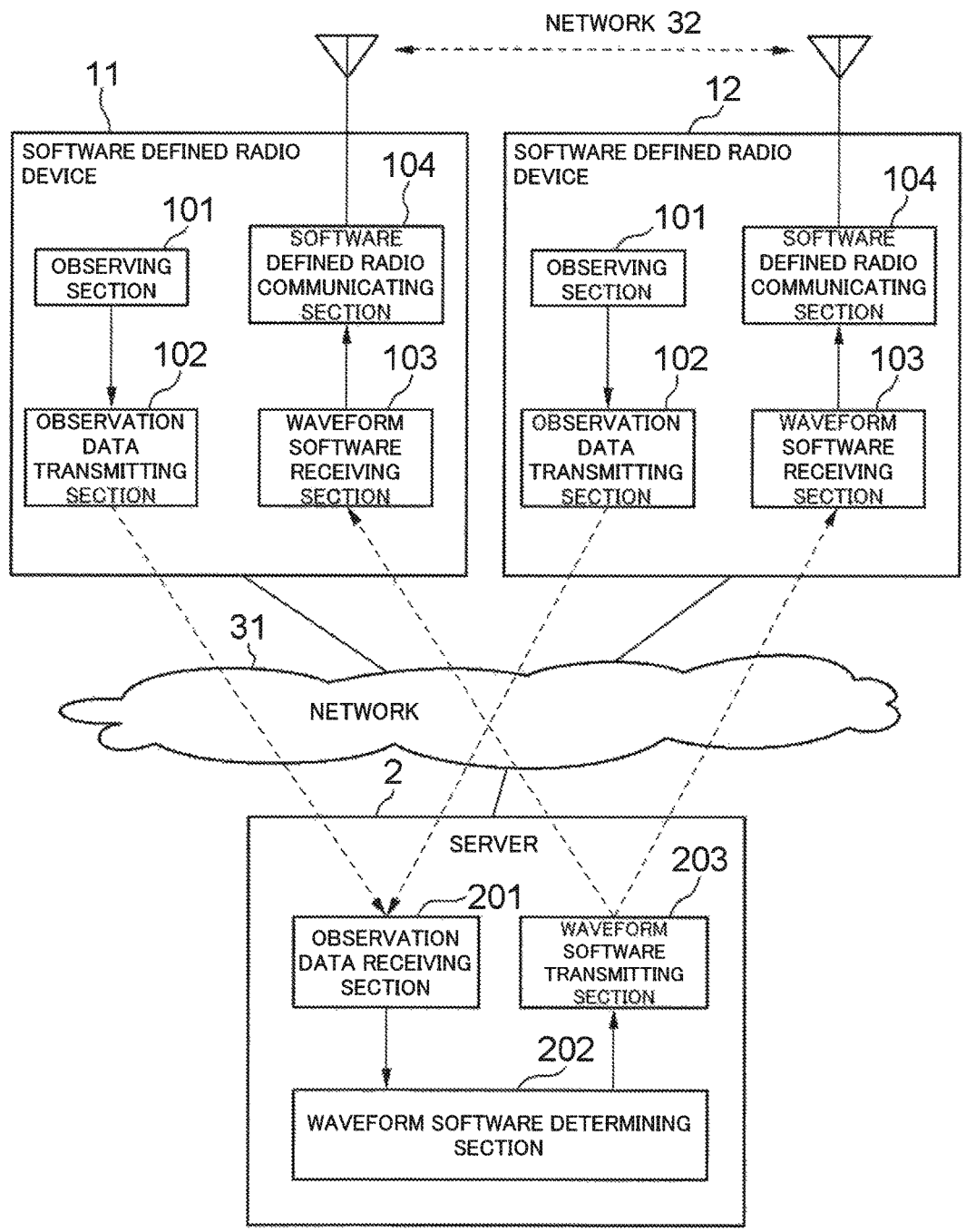
FIG. 2 is a block diagram illustrating a configuration example of a software defined radio device and a server according to the first exemplary embodiment of the present invention.

FIG. 2 is a diagram conceptually illustrating a configuration of the radio communication system and each apparatus according to the first exemplary embodiment of the present invention. For the convenience of explanation, the software defined radio devices 1 belonging to the radio communication system are assumed to be 11 and 12, and the network 3 is assumed to be constituted by a network 31 connecting the software defined radio devices 11, 12 and the server 2 and a network 32 connecting between the software defined radio devices 1. Note that the directions of the arrows in the drawing are an example, and do not limit the direction of any signal between the blocks. This also applies to the other block diagrams.

The software defined radio device 1 includes an observing section 101, an observation data transmitting section 102, a waveform software receiving section 103, and a software defined radio communicating section 104.

The observing section 101 observes a state which dynamically changes regarding the radio device such as the radio wave environment surrounding the radio device, the services provided by the radio device, and the resources of the radio device. The data representing the observed state is referred to as "observation data".

The observation data transmitting section 102 transmits observation data to the server 2.

The waveform software receiving section 103 receives waveform software from the server 2.

The software defined radio communicating section 104 operates the waveform software received by the waveform software receiving section 103.

The server 2 includes an observation data receiving section 201, a waveform software determining section 202, and a waveform software transmitting section 203.

The observation data receiving section 201 receives the observation data from the software defined radio devices 11, 12.

The waveform software determining section 202 determines the waveform software to be used for the communication between the software defined radio devices 11, 12 so that a network 32 can be established between the software defined radio devices 11, 12 based on the observation data obtained from the software defined radio devices 11, 12, i.e., so that communication can be performed between the software defined radio devices 11, 12. In the above determination, the waveform software determining section 202 may determine parameters necessary for radio communication such as a radio communication method, frequency, and an output power. In addition, the waveform software determining section 202 may, based on the determined parameters, determine the waveform software by selecting or generating the waveform software which occupies the narrowest bandwidth and consumes the least transmission power, while assuring the bandwidth required for communication between the software defined radio devices 11, 12. Specific examples of the waveform software determining section 202 are described later.

The waveform software transmitting section 203 transmits the waveform software determined in the waveform software determining section 202, to the software defined radio devices 11, 12.

The network 31 is a network connecting the software defined radio devices 11, 12, and the server 2, which may be wireless or wired.

The network 32 is a radio network which connects between the software defined radio devices 1.

[Explanation of Operations]

Figure 3:
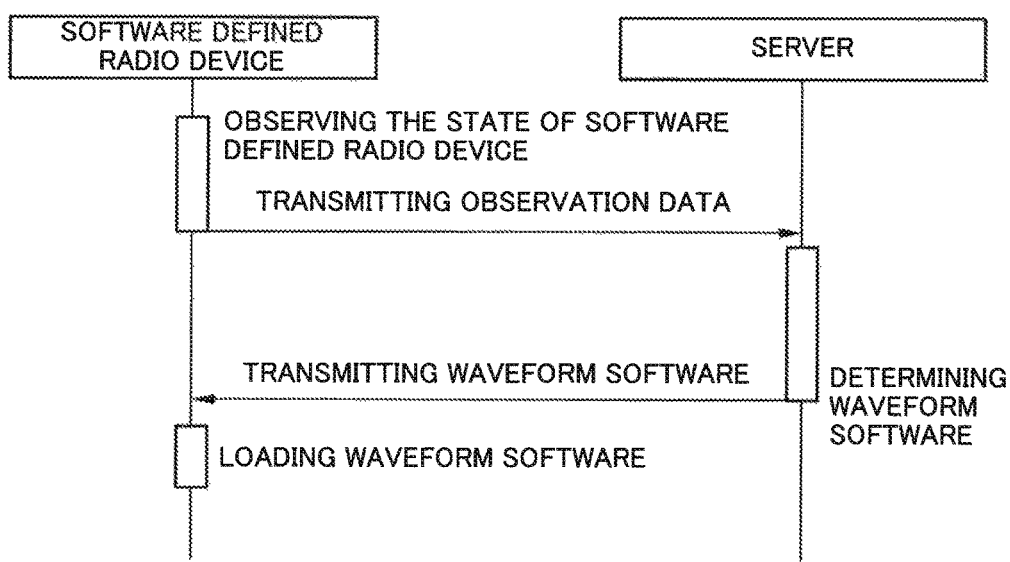
FIG. 3 is an explanatory diagram of the entire operation of the radio communication system according to the first exemplary embodiment of the present invention.
Figure 4:
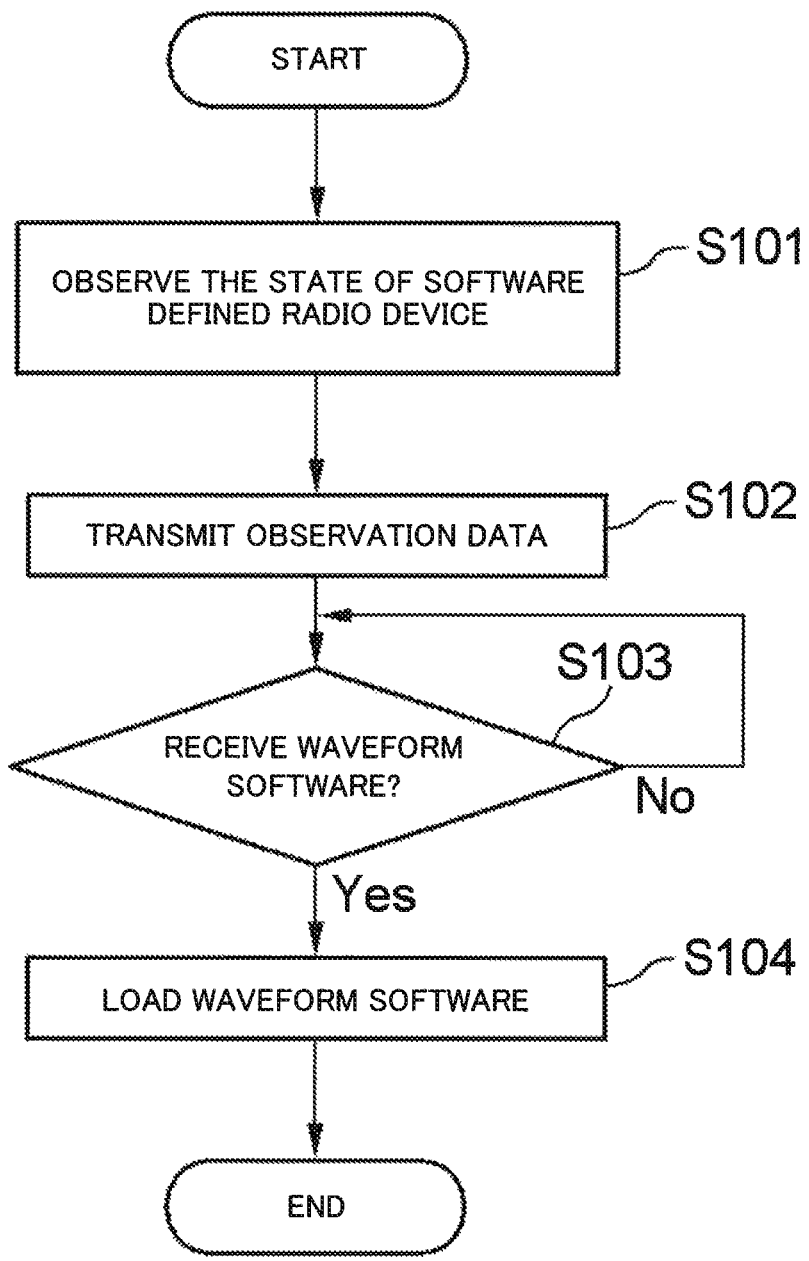
FIG. 4 is a flowchart illustrating the flow of the operation of the software defined radio device according to the first exemplary embodiment of the present invention.
Figure 5:
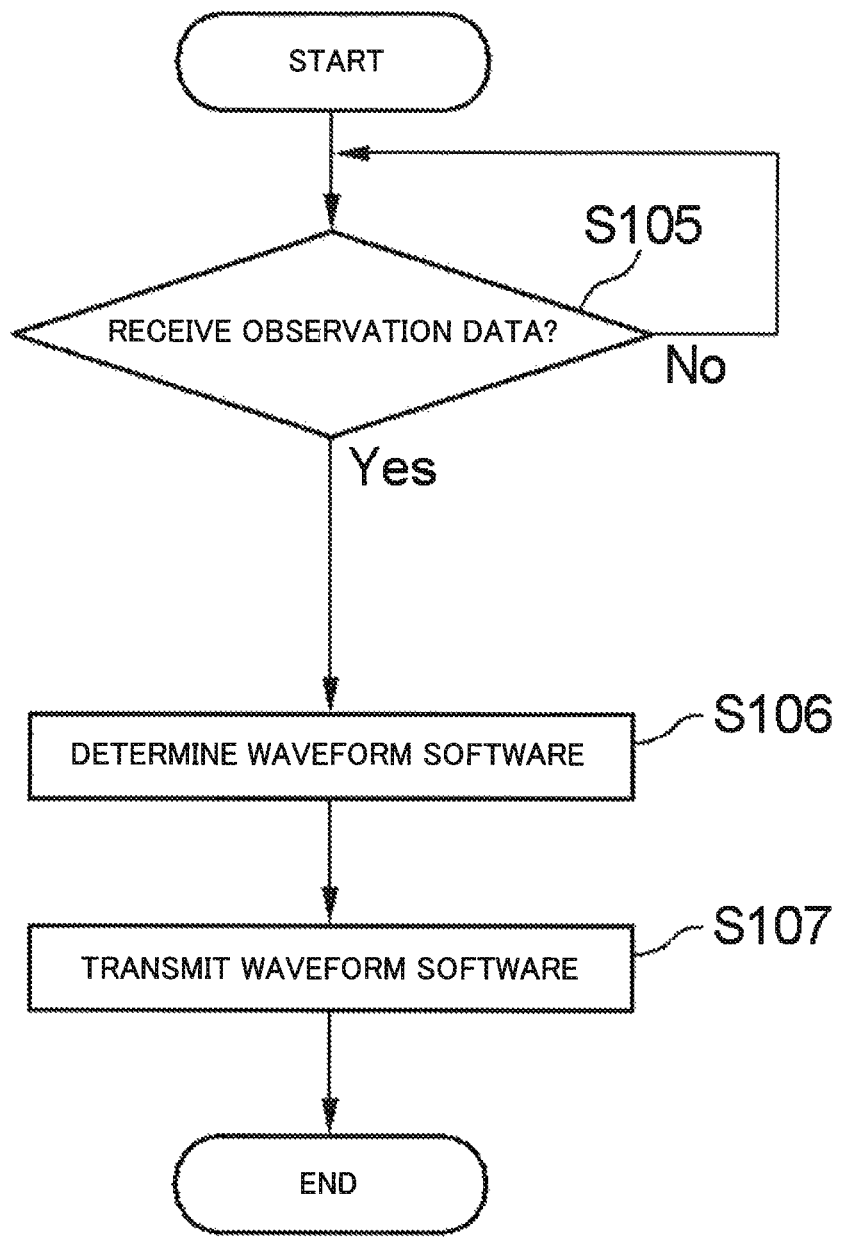
FIG. 5 is a flowchart illustrating the flow of the operation of the server according to the first exemplary embodiment of the present invention.

FIG. 3 is an explanatory diagram illustrating the entire operation of the radio communication system according to the first exemplary embodiment of the present invention; FIG. 4 is an explanatory diagram illustrating the operation of the software defined radio device 1; and FIG. 5 is an explanatory diagram illustrating the operation of the server 2.

The software defined radio device 1 is explained below. First, in Step S101, the observing section 101 of the software defined radio device 11 observes the state of the software defined radio device 11, and the observing section 101 of the software defined radio device 12 observes the state of the software defined radio device 12. In the first exemplary embodiment, each software defined radio device automatically performs the above-stated observation. The timing at which the observation is performed may be when the communication is interrupted, when requested by another software by means of a user operation or the like, or on a regular basis.

In Step S102, the observation data transmitting section 102 transmits the observation data to the server 2.

In Step S103, when the waveform software receiving section 103 of the software defined radio devices 11, 12 receives waveform software, the software defined radio communicating section 104 loads the waveform software, and each software defined radio device 11, 12 starts communicating in Step S104.

The server 2 is explained below. First, in Step S105, when the observation data receiving section 201 of the server 2 receives observation data of each software defined radio device 1, the waveform software determining section 202 determines the waveform software by selecting or generating the waveform software based on the observation data of each software defined radio device 1 in Step S106.

Next, in Step S107, the waveform software transmitting section 203 transmits the waveform software to the software defined radio device 1.

By the described configuration and operation, it becomes possible to determine the waveform software according to the state of dynamic change of the software defined radio devices 11, 12, and to perform communication without trouble between the software defined radio device 11 and 12 by establishing a network 32 between the software defined radio devices 11 and 12.

Second Exemplary Embodiment

The second exemplary embodiment is an exemplary embodiment in which the timing at which the observing section 101 of the software defined radio device 1 observes is controlled from the server 2.

Figure 6:
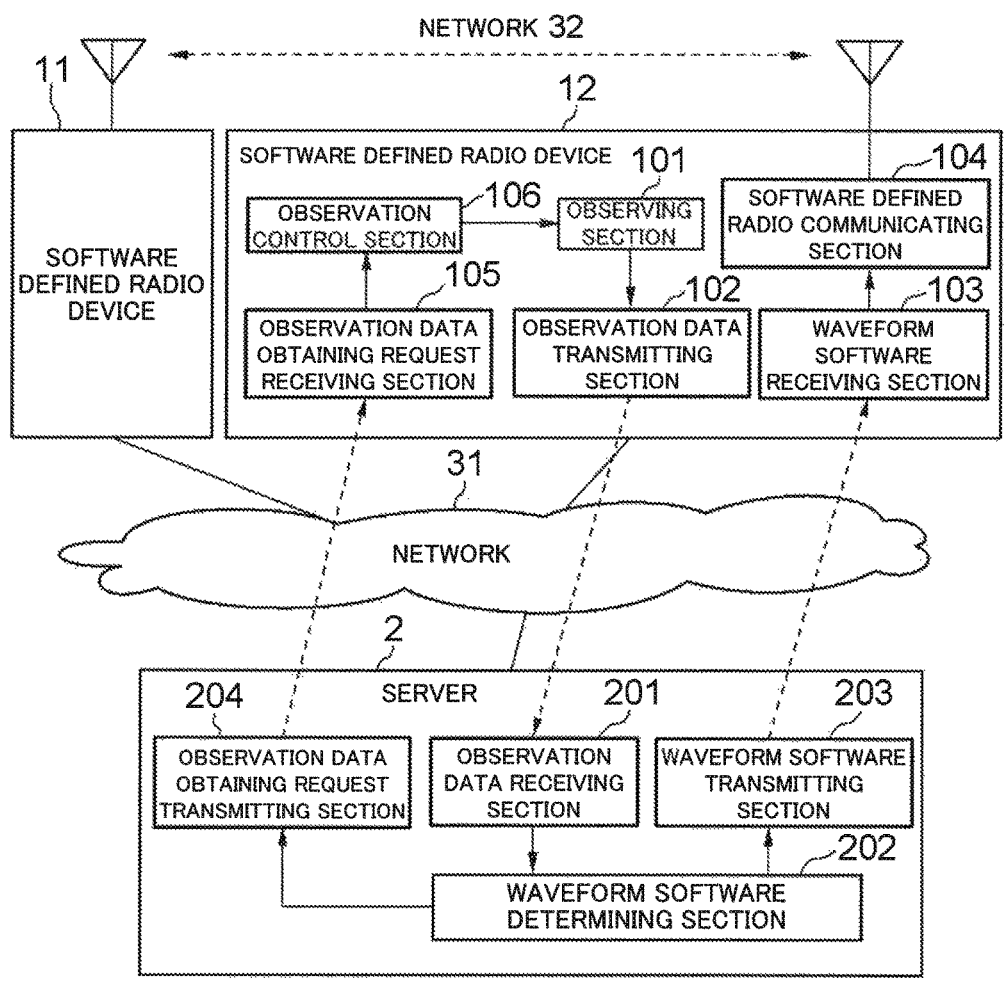
FIG. 6 is a block diagram illustrating a configuration example of a software defined radio device and a server according to a second exemplary embodiment of the present invention.

FIG. 6 is a block diagram illustrating an example of a radio communication system according to the second exemplary embodiment of the present invention. The placement of the apparatuses in the radio communication system is the same as that in the first exemplary embodiment, except that the software defined radio device 1 further has an observation data obtaining request receiving section 105 and an observation control section 106 for controlling the observing section 101, and the server 2 further has an observation data obtaining request transmitting section 204.

The observation data obtaining request receiving section 105 receives an observation data obtaining request transmitted from the server 2.

The observation control section 106 requests the observing section 101 to observe the state of the software defined radio device 1 in accordance with the observation data obtaining request received by the observation data obtaining request receiving section 105. The observing section 101, upon reception of this request, observes the state of the software defined radio device 1. Note that the observing section 101 may be configured to automatically perform observation just as in the first exemplary embodiment, even when there is no request by the observation control section 106.

The observation data obtaining request transmitting section 204 transmits the observation data obtaining request to the software defined radio device 12, in response to the request by the waveform software determining section 202. The waveform software determining section 202 may issue a request to the observation data obtaining request transmitting section 204, at any timing. For example, the waveform software determining section 202 transmits the observation data obtaining request to the software defined radio device 12, when the software defined radio device 11 transmits the observation data to the server 2 and the software defined radio device 11 requests the server 2 to communicate with the software defined radio device 12.

Note that the only destination of the observation data obtaining request in the present exemplary embodiment is the software defined radio device 12. However, when the software defined radio device 1 is connected to the network 31, the destination may include other software defined radio devices 1.

The operation of the second exemplary embodiment other than stated above is the same as that in the first exemplary embodiment, and therefore explanation thereof is omitted herebelow.

According to the stated configuration and operation, the server 2 can collect observation data if necessary, and therefore can establish the network 32 real-time, or can restrain the traffic of the observation data flowing through the network 31.

Third Exemplary Embodiment

Figure 7:
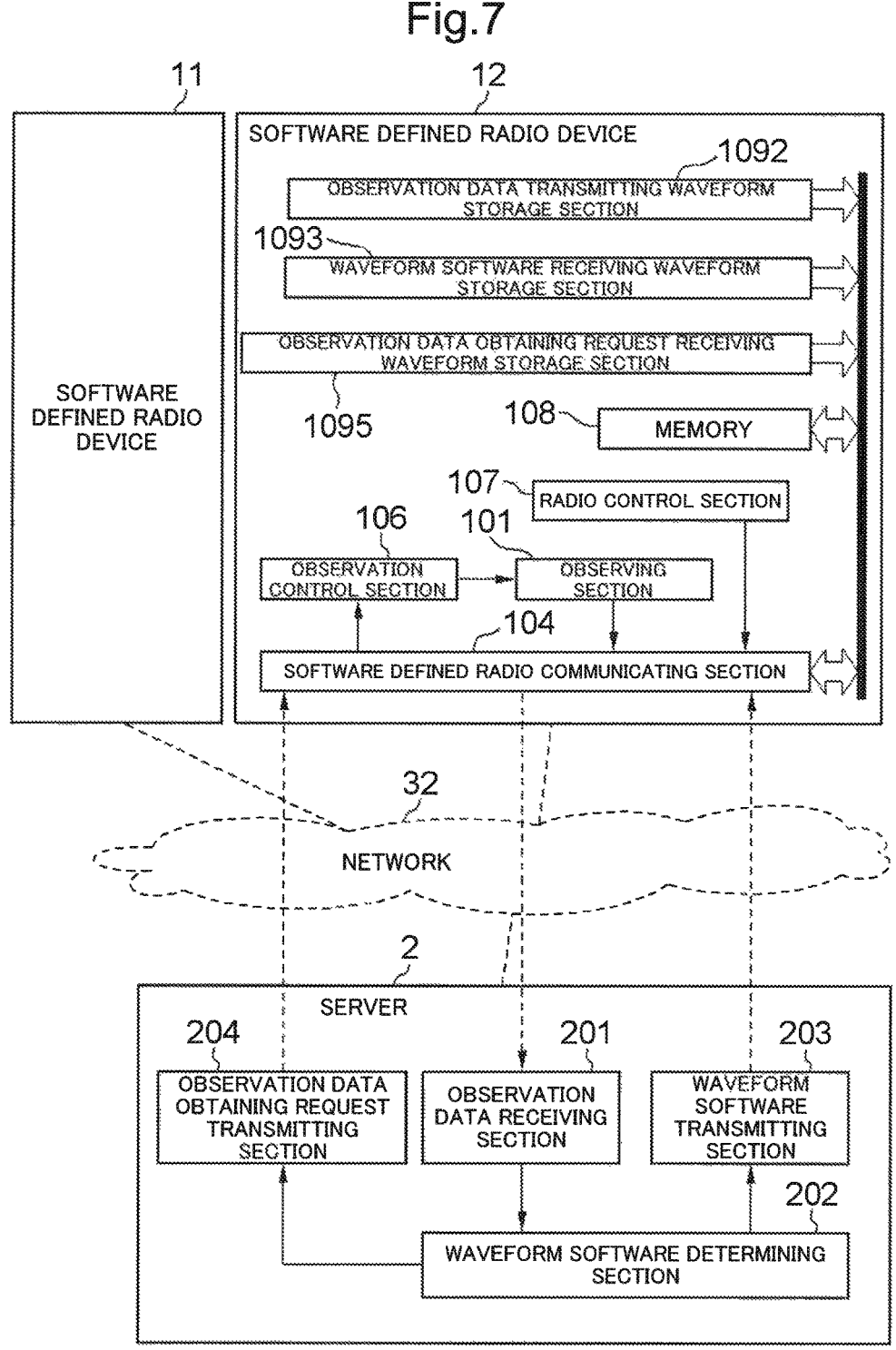
FIG. 7 is a block diagram illustrating a configuration example of a software defined radio device and a server according to a third exemplary embodiment of the present invention.

FIG. 7 is a block diagram illustrating an example of a radio communication system according to a third exemplary embodiment of the present invention. The third exemplary embodiment is an exemplary embodiment in which the communication interface with respect to the server 2 of the software defined radio device 1 is realized by the software defined radio communicating section 104, to allow the network 32 to play the role of the network 31. That is, in relation to the first exemplary embodiment, the role of the waveform software receiving section 103 and the observation data transmitting section 102 is played by the software defined radio communicating section 104. Furthermore, in relation to the second exemplary embodiment, the role of the observation data obtaining request receiving section 105 is played by the software defined radio communicating section 104.

To realize the above, so as to be able to change the role of the software defined radio communicating section 104 from one time to another, a radio control section 107 is added to the software defined radio device 1. While the software defined radio communicating section 104 is communicating with server 2, the waveform software sent from the server 2 cannot be loaded in the software defined radio communicating section 104. To temporarily store the transmitted waveform software, a memory 108 is added to the software defined radio device 1. Furthermore, so as to allow the software defined radio device 1 to connect to the server 2 when necessary, the observation data obtaining request receiving waveform storage section 1095, the observation data transmitting waveform storage section 1092, and the waveform software receiving waveform storage section 1093 are added to store the waveform software describing the radio communication method of the observation data transmitting section 102, the waveform software receiving section 103, and the observation data obtaining request receiving section 105.

Although FIG. 7 illustrates change to the configuration of the software defined radio device 1 in the second exemplary embodiment, it is obvious that the same change to the configuration of the first exemplary embodiment can be made.

Figure 8:
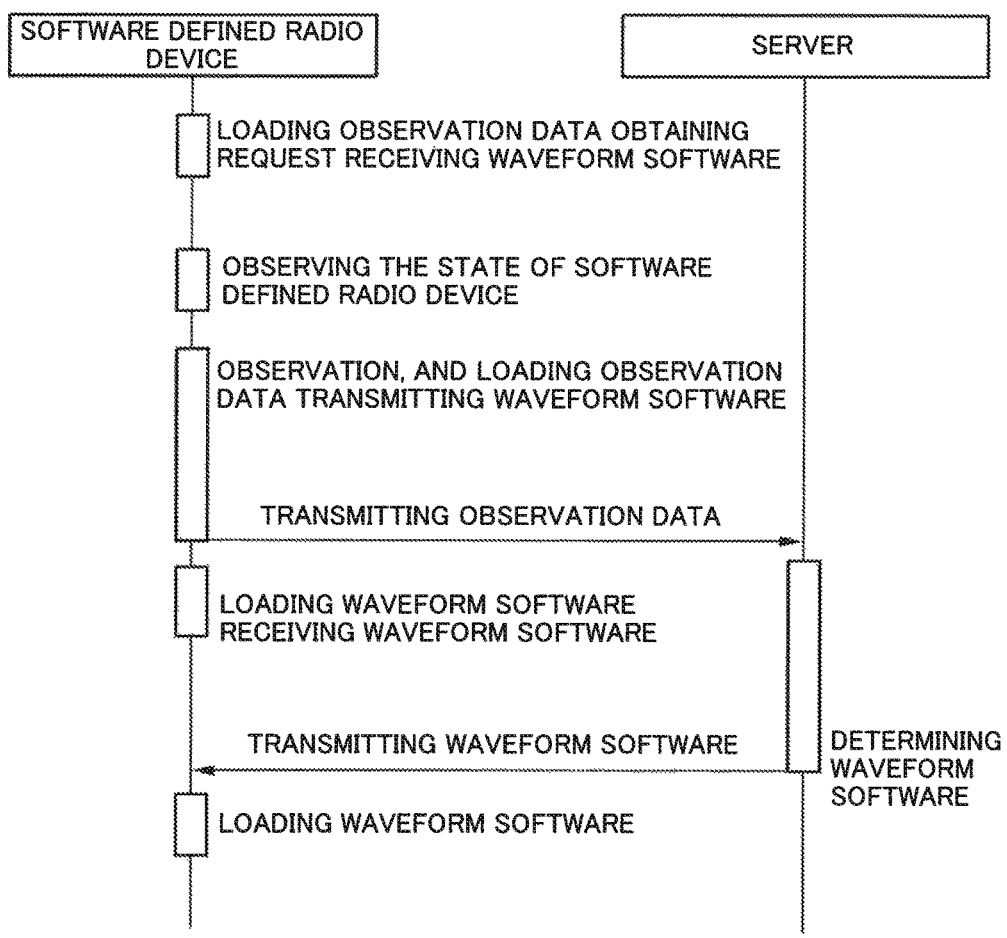
FIG. 8 is an explanatory diagram of the entire operation of the radio communication system according to the third exemplary embodiment of the present invention.
Figure 9:
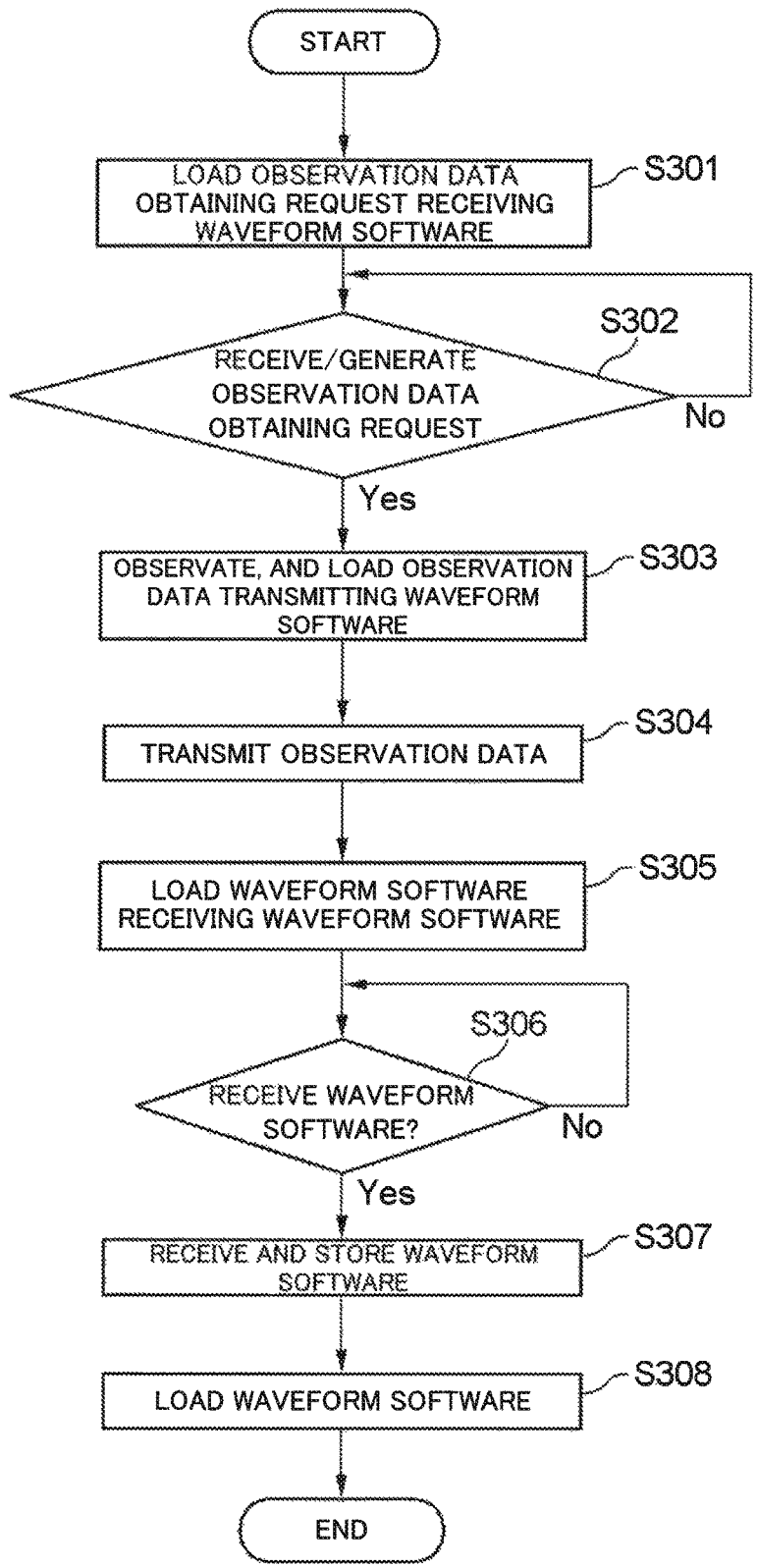
FIG. 9 is a flowchart illustrating the flow of the operation of the software defined radio device according to the third exemplary embodiment of the present invention.

FIG. 8 is an explanatory diagram of the entire operation of the radio communication system according to the third exemplary embodiment of the present invention, and FIG. 9 is an explanatory diagram of the operation of the software defined radio device 1. The operation of the server 2 is the same as in the second exemplary embodiment, and therefore the explanation thereof is omitted herebelow.

The software defined radio device 1 is explained below. In Step S301, the radio control section 107 of the software defined radio device 1 loads the observation data obtaining request receiving waveform software, from the storage section 1095 to the software defined radio communicating section 104, to be able to receive the observation data obtaining request.

Next, in Step S302, when the observation data obtaining request is received or when the request for obtaining observation data is generated in the software defined radio device 1, in Step S303, the observation control section 106 makes the observing section 101 observe the state of its own radio device. The radio control section 107 loads the observation data transmitting waveform software, from the storage section 1092 to the software defined radio communicating section 104. The observation of its own radio device's state and loading of the observation data transmitting waveform software may be performed substantially simultaneously.

In Step S304, the software defined radio section 104 transmits the observation data to the server.

In Step S305, the radio control section 107 of the software defined radio device 1 loads the waveform software receiving waveform software from the waveform software receiving waveform storage section 1093 to the software defined radio communicating section 104.

In Step S306, if the waveform software is received from the server, the software defined radio communicating section 104 of the software defined radio device 1 receives the waveform software transmitted from the server 2 and stores it in the memory 108 in Step S307.

In Step S308, the radio control section 107 loads, to the software defined radio communicating section 104, the waveform software stored in the memory 108.

The operations other than stated above are the same as those in the second exemplary embodiment.

By the described configuration and operation, it becomes possible to collect each type of communication interface of the software defined radio device 1 to the software defined radio communicating section 104, thereby making it possible to reduce the number of hardware and networks related to the radio communication of the software defined radio device 1.

Fourth Exemplary Embodiment

Figure 10:
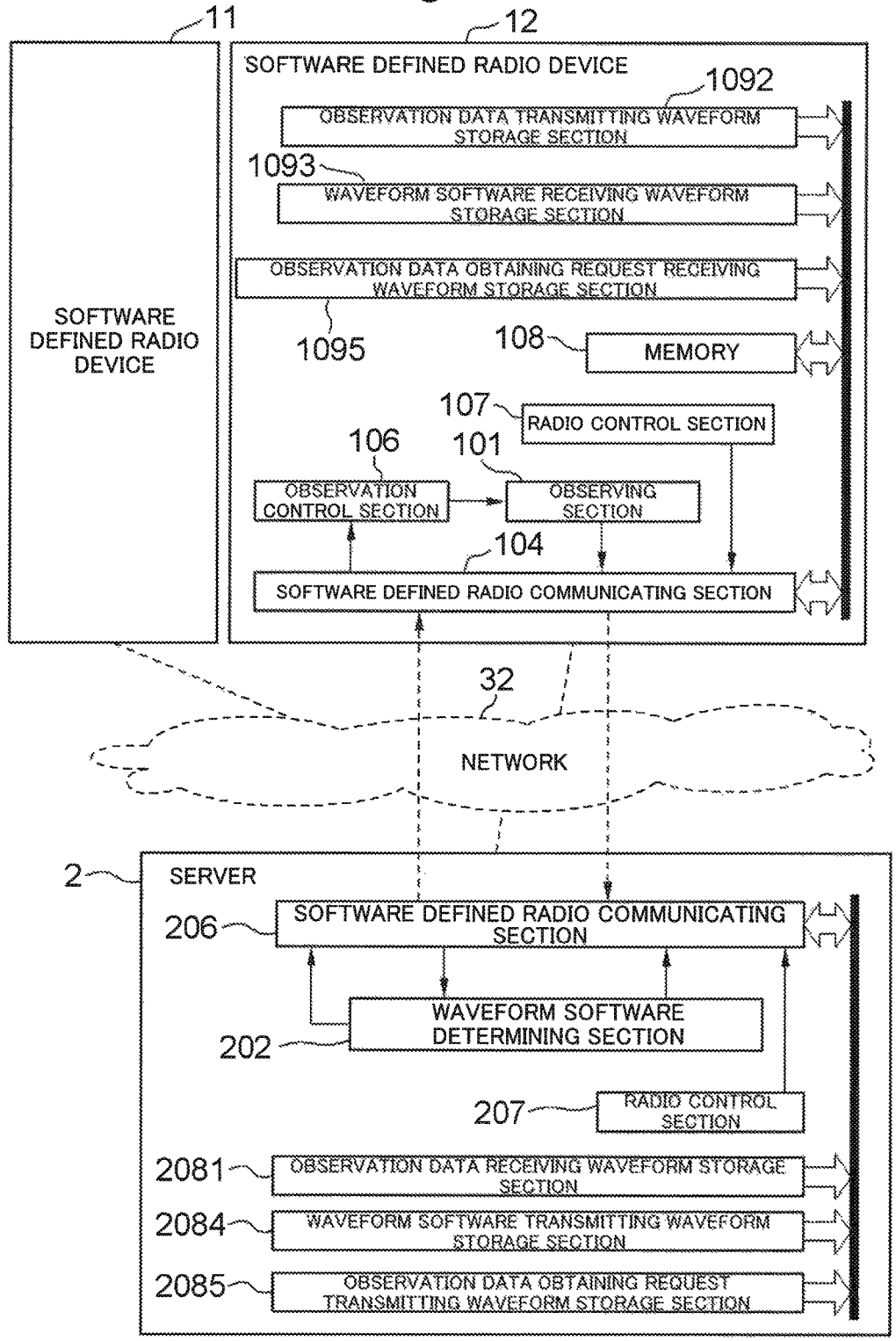
FIG. 10 is a block diagram illustrating a configuration example of a software defined radio device and a server according to the fourth exemplary embodiment of the present invention.

FIG. 10 is a block diagram illustrating an example of a radio communication system according to the fourth exemplary embodiment of the present invention. In the fourth exemplary embodiment, the role of the observation data receiving section 201, the waveform software transmitting section 203, and the observation data obtaining request transmitting section 204 of the server 2 in the third exemplary embodiment is played by the software defined radio communicating section 206. Note that although the present exemplary embodiment illustrates change to the configuration of the software defined radio device 1 in the third exemplary embodiment, it is obvious that the same change to the configuration of the first and second exemplary embodiments can be made. Moreover, so that the software defined radio communicating section 206 can play the role of the observation data receiving section 201, the waveform software transmitting section 203, and the observation data obtaining request transmitting section 204, it is necessary to change the radio communication method of the software defined radio communicating section 206 from one time to another. With this in view, in the configuration of the server 2 according to the present exemplary embodiment, a radio control section 207 is included, and an observation data receiving waveform storage section 2081, a waveform software transmitting waveform storage section 2084, and an observation data obtaining request transmitting waveform storage section 2085 are included to store the waveform software describing the radio communication method of the observation data receiving section 201, the waveform software transmitting section 203, and the observation data obtaining request transmitting section 204.

Figure 11:
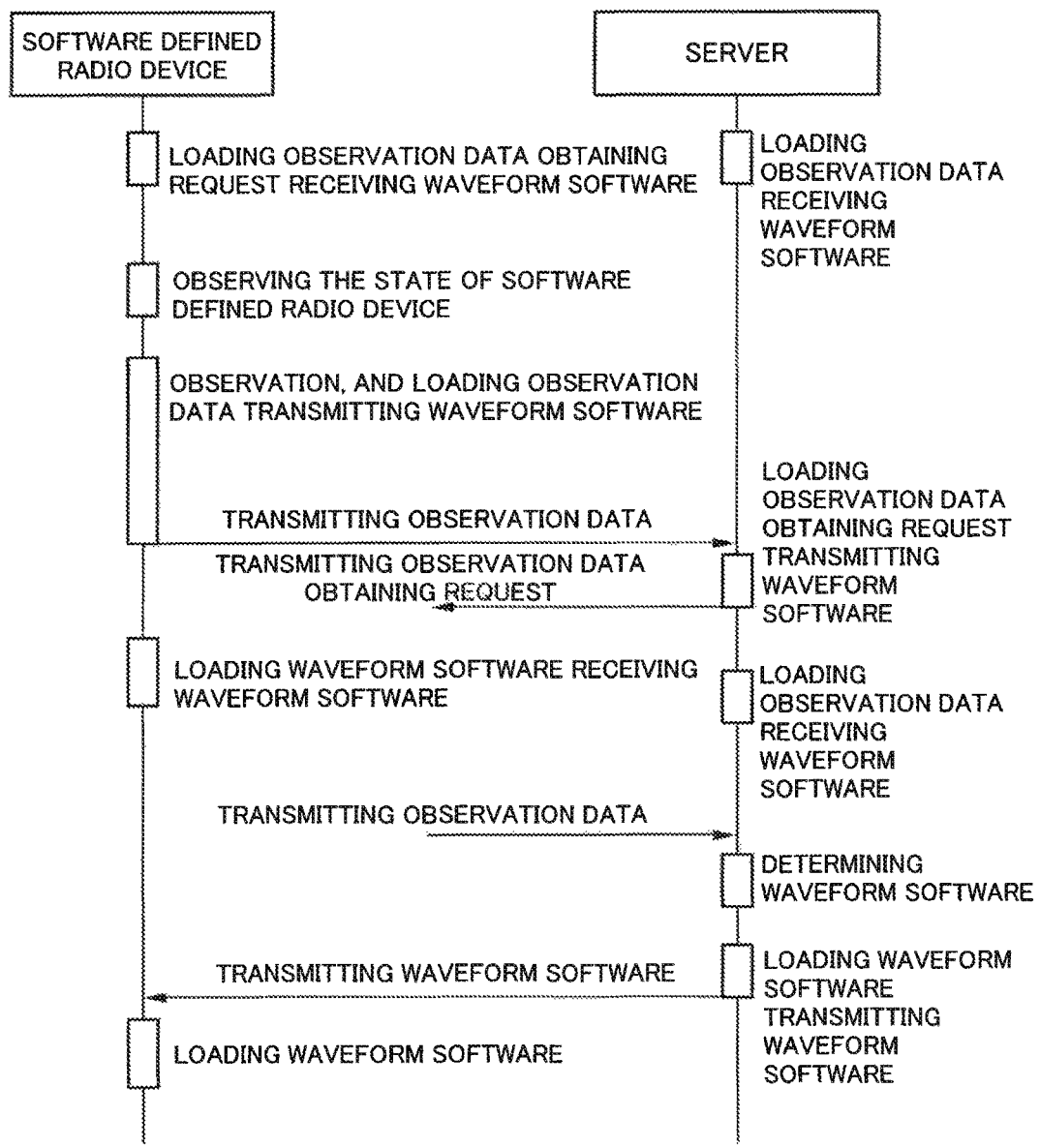
FIG. 11 is an explanatory diagram of the entire operation of the radio communication system according to the fourth exemplary embodiment of the present invention.
Figure 12:
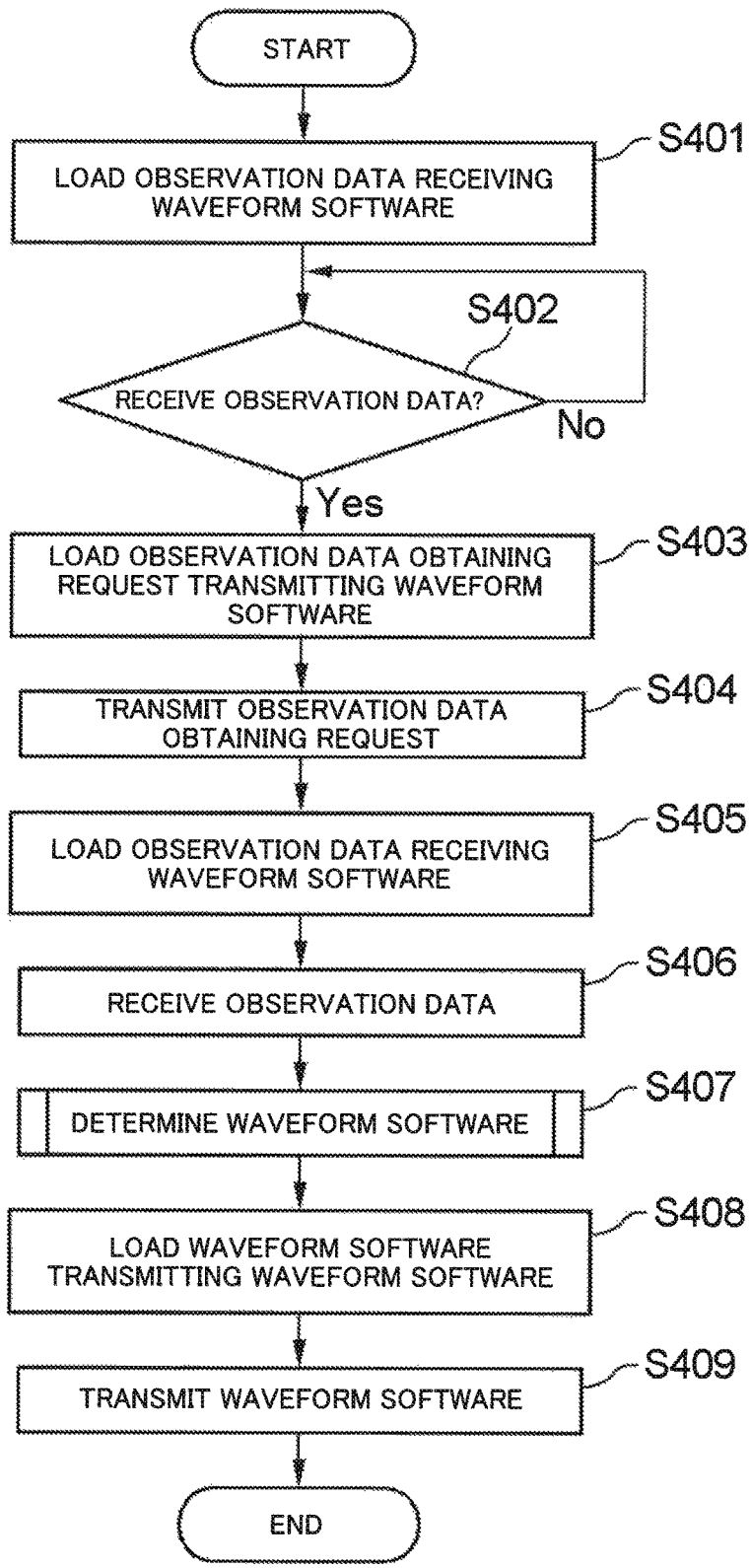
FIG. 12 is a flowchart illustrating the flow of the operation of the server according to the fourth exemplary embodiment of the present invention.

FIG. 11 is an explanatory diagram of the exemplary entire operation of the communication system according to the fourth exemplary embodiment of the present invention, and FIG. 12 is an explanatory diagram of the operation of the server 2. The operation of the software defined radio device 1 is the same as in the third exemplary embodiment, and therefore the explanation thereof is omitted herebelow.

The following explains the server 2. First, in Step S401, the radio control section 207 loads the observation data receiving waveform software from the observation data receiving waveform storage section 2081 to the software defined radio communicating section 206, to be able to receive the observation data from the software defined radio device 1.

Next, in Step S402, when the observation data has been received from the software defined radio device 1, the software defined radio communicating section 206 loads the observation data obtaining request transmitting waveform software from the observation data obtaining request transmitting waveform storage section 2085 to the software defined radio communicating section 206 in Step S403.

In Step S404, the software defined radio communicating section 206 transmits the observation data obtaining request to the software defined radio device 12.

In Step S405, to be able to receive the observation data again, the radio control section 207 loads the observation data receiving waveform software from the observation data receiving waveform storage section 2081 to the software defined radio communicating section 206.

In Step S406, the software defined radio communicating section 206 receives observation data from the other software defined radio devices 1.

In Step S407, the process corresponding to Step S106 in the first exemplary embodiment is performed, to determine waveform software.

In Step S408, the communication control section 207 loads the waveform software transmitting waveform software from the waveform software transmitting waveform storage section 2084 to the software defined radio communicating section 206.

In Step S409, the software defined radio communicating section 206 transmits the waveform software determined in the waveform software determining section 202, to the software defined radio device 1.

By the described configuration and operation, it becomes possible to collect each type of communication interface of the server 2 to the software defined radio communicating section 206, thereby making it possible to reduce the number of hardware related to the radio communication of the server 2.

Further, after transmitting the waveform software, the server 2 operates the transmitted waveform software in the software defined radio communicating section 206, thereby making it possible to continuously communicate with the software defined radio device 1. Accordingly, the server 2 can be operated also as a base station, and therefore the present exemplary embodiment can be applied to the communication between base stations and terminals, not only to the communication between terminals.

Fifth Exemplary Embodiment

The fifth exemplary embodiment is an exemplary embodiment in which the software defined radio device 1 described in the first exemplary embodiment is used as the communication interface with respect to the network 32 according to the fourth exemplary embodiment.

Figure 13:
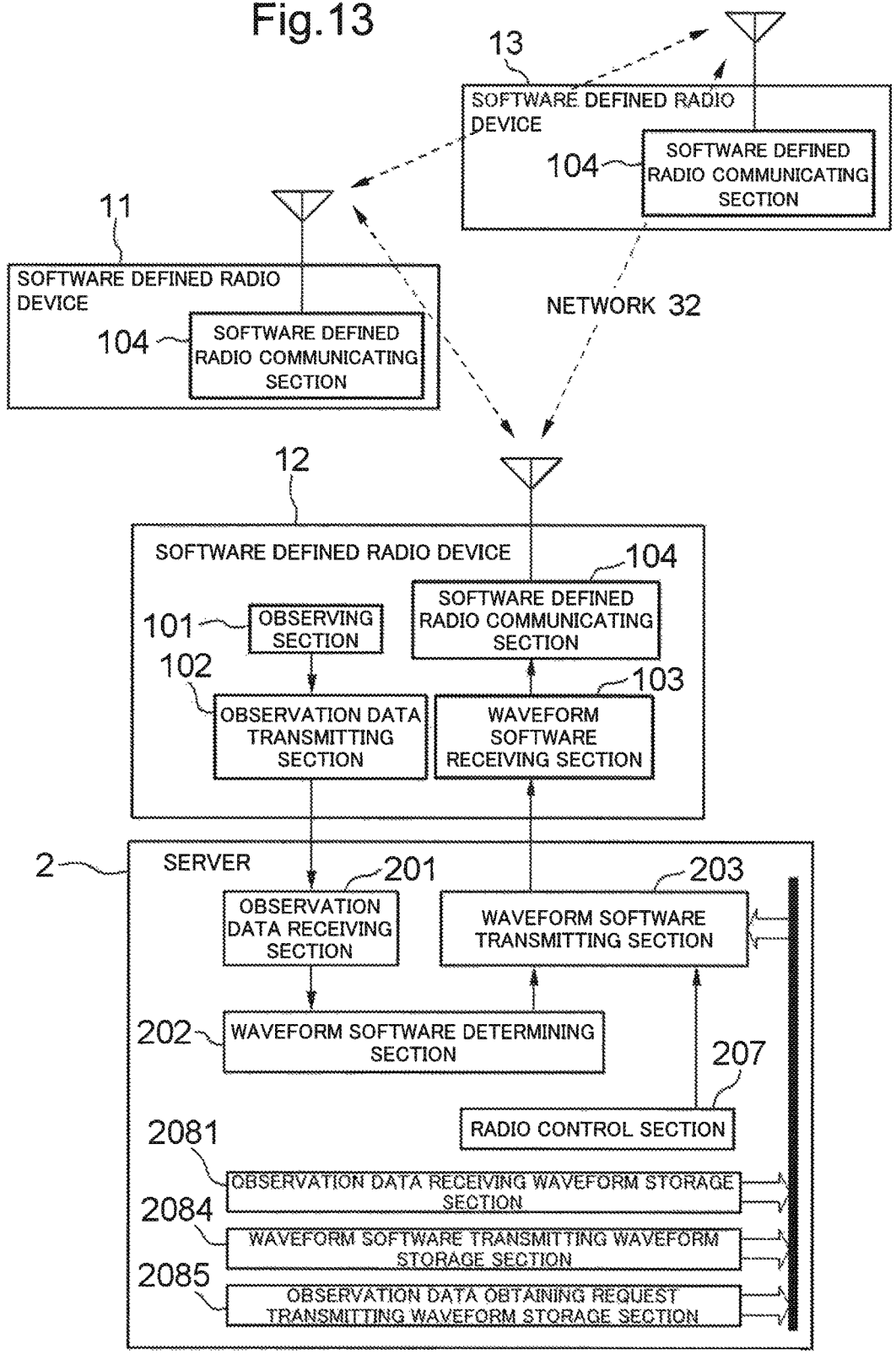
FIG. 13 is a block diagram illustrating a configuration example of a software defined radio device and a server according to the fifth exemplary embodiment of the present invention.

FIG. 13 is a block diagram illustrating an example of the radio communication system according to the fifth exemplary embodiment according to the present invention. The software defined radio devices 11, 13 are the same as those in the third exemplary embodiment, and the software defined radio device 12 is the same as that in the first exemplary embodiment. However, the software defined radio device 12 and the server 2 need not to be connected wirelessly, and since it is a short-distance communication, the communication between the observation data transmitting section 102 and the observation data receiving section 201, the communication between the waveform software receiving section 103 and the waveform software transmitting section 203 can be realized by wire communication or the interconnection within the apparatus.

The following explains the software defined radio device 12. When the waveform software transmitted from the server 2 is received by the waveform software receiving section 103, the software defined radio communicating section 104 loads the received waveform software to the software defined radio device 1, i.e. to the software defined radio devices 11, 12, 13, without triggering by the observing section 101. In the server 2, besides the waveform software determining section 202, a radio control section 207 is included to sequentially load the observation data receiving waveform storage section 2081, the waveform software transmitting waveform storage section 2084, the observation data obtaining request transmitting waveform storage section 2085, and the waveform software thereof, so that the software defined radio device 12 can also load the observation data receiving waveform software, waveform software transmitting waveform software, and the observation data obtaining request transmitting waveform software.

Since the operation of the fifth exemplary embodiment is obvious from the fourth exemplary embodiment, the explanation thereof is omitted herebelow.

According to the described configuration and operation linked with the software defined radio device 12, the server 2 can also initiate establishing the network 32. This effect is more pronounced in the communication between terminals.

Sixth Exemplary Embodiment

In the sixth exemplary embodiment, a specific example of the waveform software determining section 202 according to the first to fifth exemplary embodiments is explained.

Figure 14:
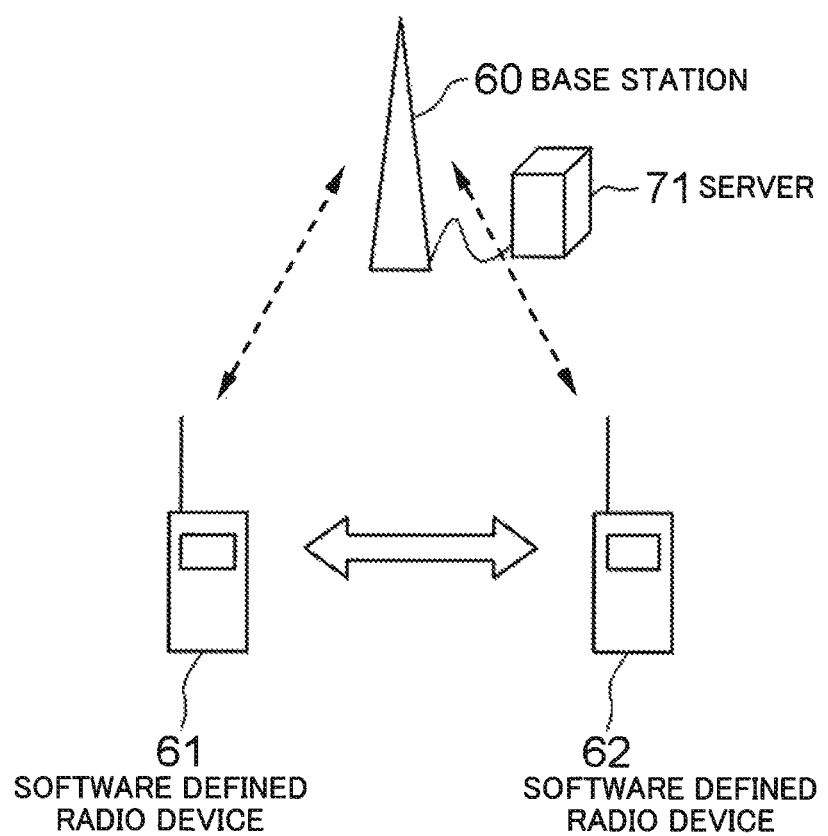
FIG. 14 is a block diagram of a radio communication system according to a sixth exemplary embodiment of the present invention.

FIG. 14 illustrates a configuration example of the present exemplary embodiment. The present exemplary embodiment is configured by the software defined radio device 61, the software defined radio device 62, the server 71, and the base station 60 for wirelessly connecting the server 71 and the software defined radio device 61, 62.

In the present exemplary embodiment, the waveform software is determined based on the radio wave environment surrounding the software defined radio device 61, 62.

Figure 15A:
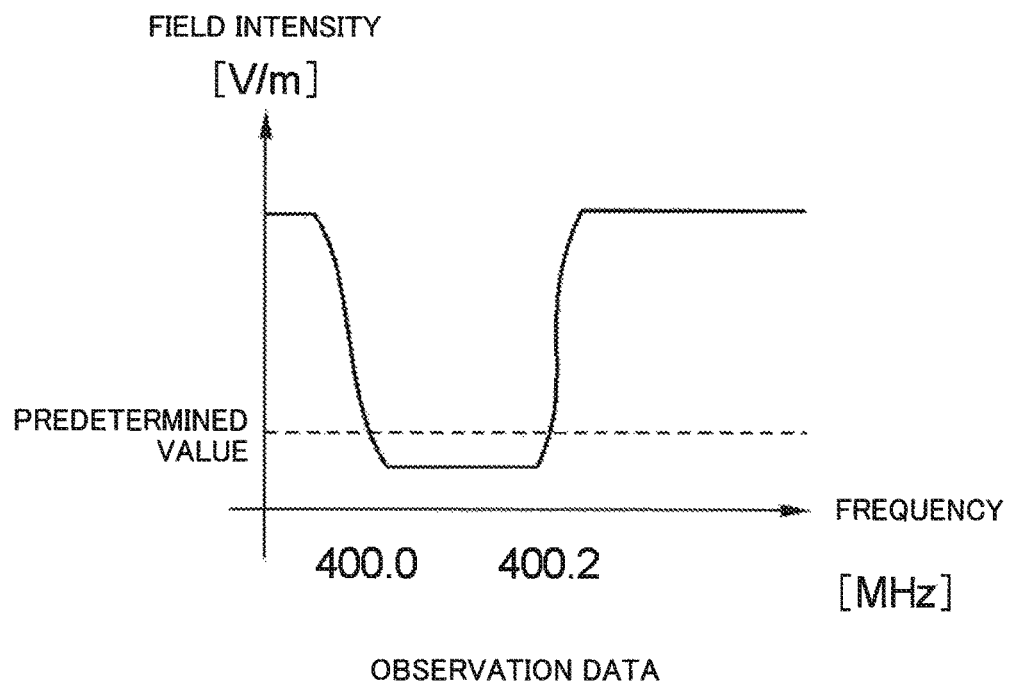
FIG. 15A is a diagram illustrating a specific example of data observed in a software defined radio device 61 according to the sixth exemplary embodiment of the present invention.
Figure 15B:
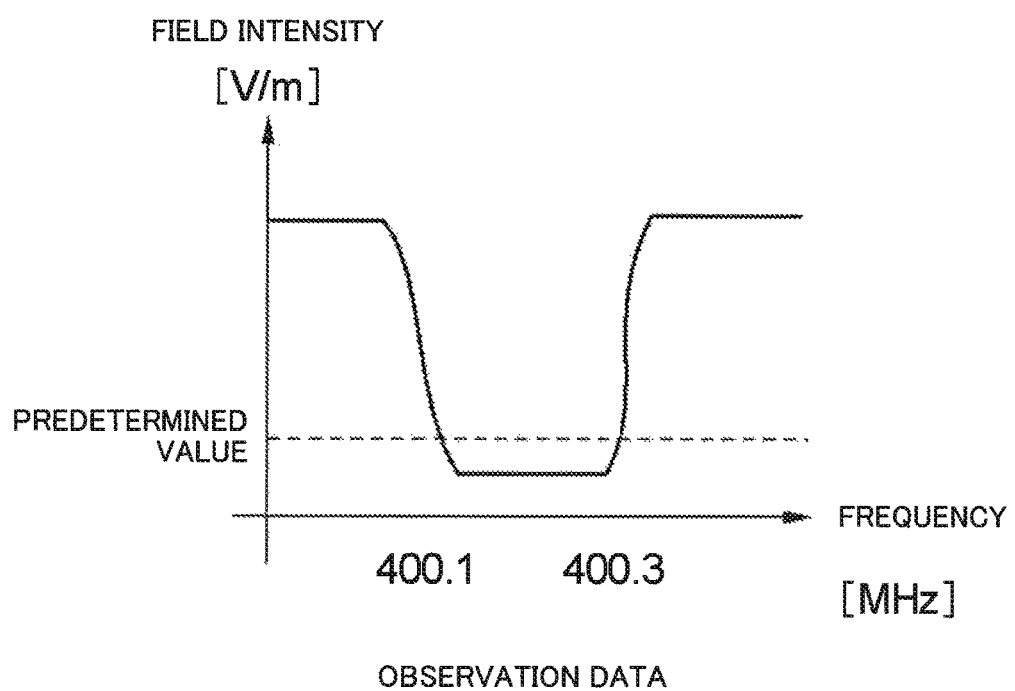
FIG. 15B is a diagram illustrating a specific example of data observed in a software defined radio device 62 according to the sixth exemplary embodiment of the present invention.

FIG. 15A illustrates observation data transmitted from the software defined radio device 61 to the server 71, and FIG. 15B illustrates observation data transmitted from the software defined radio device 62 to the server 71. The observation data in FIG. 15A and FIG. 15B is data illustrating each surrounding radio wave environment observed by the observing sections of the software defined radio devices 61, 62. The observation data in FIG. 15A shows that the field intensity from 400.0 [MHz] to 400.2 [MHz] is below a predetermined value, while the observation data in FIG. 15B shows that the field intensity from 400.1 [MHz] to 400.3 [MHz] is below the predetermined value.

The waveform software determining section in the server 71, if the field intensity is equal to or above the predetermined value, determines that the relevant frequency is used by another radio device or the like. Conversely if the field intensity is below the predetermined value, the waveform software determining section in the server 71 determines that the relevant frequency is not used. Thus, the waveform software determining section in the server 71 determines the frequency band which is below the predetermined value in both observation data in FIG. 15A and FIG. 15B, i.e., from 400.1 [MHz] to 400.2 [MHz] to be the frequency not used by any other radio device or the like.

The waveform software determining section in the server 71 determines waveform software usable between 400.1 [MHz] and 400.2 [MHz]. During this process, if a plurality of pieces of waveform software satisfy the frequency condition, another condition, e.g., a bandwidth, is taken into consideration, to determine waveform software that realizes a communication method of which the bandwidth is narrower.

In the present exemplary embodiment, the waveform software determining section in the server 71 includes a library storing therein waveform software, from which appropriate waveform software is selected.

FIG. 16 illustrates a configuration example of a library. The library in this example stores therein sets each included of waveform software, a communication method, a frequency [MHz] and a bandwidth [Hz]. For example, the waveform software AA on the first line is waveform software for realizing a communication method of a FM system A having a frequency of 400.15 [MHz] and a bandwidth of 25 kHz.

For example, in the library illustrated in FIG. 16, there are waveform software AA, waveform software DA, and waveform software DB that can use a frequency from 400.1 [MHz] to 400.2 [MHz]. From them, the digital system B has the narrowest bandwidth, and therefore the waveform software determining section in the server 71 selects the waveform software DB.

Some communication methods can be tuned by changing parameters. For such methods, the waveform software determining section may, not only selecting the waveform software, dynamically generate the waveform software to restrict the modulation index or the frequency deviation of the input signal to make the occupied bandwidth narrower.

By adding the position information of the software defined radio devices 61, 62 to the observation data generated by the observing section of the software defined radio device, the waveform software determining section of the server may determine a minimum necessary transmission power from the positional relation between the two radio devices, and set it as a parameter to the waveform software.

In addition, by adding QoS information of a signal received by the software defined radio devices 61, 62 to the observation data generated by the observing section of the software defined radio device, the software defined radio devices 61, 62, even during communication, transmit the observation data to the server. By doing so, the waveform software determining section of the server may determine the minimum necessary transmission power, from the QoS of the signal received by the radio device during communication, and set the parameter to the waveform software. For example, the waveform software determining section of the server may determine the minimum necessary transmission power by increasing the transmission power if the QoS worsens and decreasing the transmission power if the QoS is favorable.

Seventh Exemplary Embodiment

In the sixth exemplary embodiment, all the plurality of communication methods that can be established between the software defined radio devices establish one communication channel (channel) for one carrier wave (frequency). As opposed to this, in the seventh exemplary embodiment described below, a plurality of communication channels (channel) are established for one carrier wave (frequency).

In general, it is called multiplex to establish a plurality of communication channels for a single carrier wave. In a system of multiplexed communication (hereinafter referred to as "multiplex communication"), an apparatus for controlling multiplex communication controls which communication device uses which channel. In the radio communication system, a base station, or an apparatus associated therewith has a function to control the multiplex communication. Some examples of the multiplexing include a time-division system by which communication channels are switched from time to time, and a code-division system in which a predetermined code is superimposed on a signal.

From the viewpoint of frequency usage efficiency, compared to the sixth exemplary embodiment in which the frequencies are allotted in response to the request by the software defined radio device, the present exemplary embodiment which allots one communication channel of multiplexed carrier wave can be more efficient overall.

The entire configuration of the seventh exemplary embodiment is the system configuration illustrated in FIG. 14, just as the sixth exemplary embodiment, however is different from that of the sixth exemplary embodiment in which the server 71 has a function of controlling the multiplex communication.

FIG. 17 illustrates an exemplary configuration of a library included in the waveform software determining section of the server 71. The library in this example stores therein sets each included of waveform software, a communication method, a frequency, a bandwidth, a degree of multiplexing, and the number of empty communication channels. For example, the waveform software A on the first line is waveform software for realizing a communication method referred to as "digital system A" having a frequency of 400.35 [MHz], a bandwidth of 12.5 kHz, and a multiplexing degree of 1, for which the number of currently empty communication channels is recorded as one. Note that in FIG. 17, the number of empty communication channels that dynamically changes is managed by the library of the waveform software. However, the number of empty communication channels may be managed by a table different from the library.

When such observation data as illustrated in FIG. 15A and FIG. 15B is transmitted from the software defined radio devices 61, 62, the waveform software determining section of the server 71, after determining that it is the frequency bandwidth (below 400.1 [MHz] and equal to or above 400.2 [MHz]) assumed to be used by any of the observation data, confirms whether there is an empty channel in the frequency bandwidth, unlike the sixth exemplary embodiment. Referring to FIG. 17, there are three pieces of waveform software that can be used for 400.35 [MHz], namely, waveform software A, waveform software B, and waveform software C, each of which has an empty channel. If a plurality of pieces of waveform software satisfy the frequency condition and include an empty channel, by taking into consideration another condition, e.g., bandwidth, one of them that can realize the communication method of a narrower bandwidth is determined, just as in the sixth exemplary embodiment. Among the waveform software A, B, C, the waveform software B has the narrowest bandwidth for the carrier wave. However, the waveform software C has the narrowest bandwidth in terms of the bandwidth per communication channel obtained by dividing the bandwidth of the carrier wave by a multiplexing degree. Therefore, the waveform software determining section of the server 71 selects the waveform software C having the narrowest bandwidth per communication channel. If there is no empty channel, the waveform software is determined based on the unused frequency, just as in the sixth exemplary embodiment. In addition, if a control signal transmitted from a base station 60 is not appropriately received, the software defined radio devices 61, cannot use the radio network for the multiplex communication. In addition, solely with the observation data illustrated in FIG. 15A and FIG. 15B, the case in which the field intensity is equal to or above the threshold value due to the radio wave transmitted from a base station 60 cannot be distinguished from the case in which the field intensity is equal to or above the threshold value due to the radio wave from other radio devices. Therefore, it is desirable that the observing section in the software defined radio device add information indicating whether the control signal from the base station 60 has been appropriately received, to the observation data to be transmitted to the server 71.

Eighth Exemplary Embodiment

In the eighth exemplary embodiment, an example is shown in which the software defined radio devices 61, 62, determine waveform software based on the service provided to a user, as another specific example of the waveform software determining section 202 in the above-described first to fifth exemplary embodiments. The entire configuration of the eighth exemplary embodiment is the system configuration illustrated in FIG. 14, just as the sixth exemplary embodiment, however is different from the sixth exemplary embodiment in the following functions of the software defined radio devices 61, 62 and the server 71. The software defined radio device activates an application to be used when a user uses a communication function, and when starting a service, the observing section transmits, to the server 71, the application's identification information, or a service type or a service priority level information, as observation data prior to starting the communication. Exemplary methods to obtain observation data in the observing section of the software defined radio device 61 include extracting a port number, a communication transmitter Ethernet address, a transmission destination IP address, a VLAN ID (Virtual Local Area Network Identification), MPLS (Multi Protocol Label Switching) label, and the like, from a header of an IP (Internet protocol) packet issued by the application.

The waveform software determining section of the server 71 determines the necessary transmission rate based on the service type transmitted from the software defined radio device 61. For example, in the present exemplary embodiment, the waveform software determining section of the server 71 includes a table in which the minimum necessary transmission rates for service types are recorded, and the necessary transmission rate is determined by referring to the table.

FIG. 18 illustrates a configuration example of a table. The table in this example stores sets each included of a service type and a transmission rate. For example, the first line indicates that if the service type represents audio transmission, the necessary transmission rate is 9.6 k [bps].

The waveform software determining section of the server 71, after having determined the transmission rate as in the above, determines the waveform software based on that result. In the present exemplary embodiment, the waveform software determining section of the server 71 includes a library storing therein waveform software, from which appropriate waveform software is selected.

FIG. 19 illustrates a configuration example of a library. The library in this example stores therein sets each included of waveform software, a communication method, a frequency [MHz], a transmission rate [bps], and a bandwidth [Hz]. For example, the waveform software A on the first line is waveform software for realizing a communication method, which is called "digital system A" having a frequency of 401.0 [MHz], a transmission rate of 9.6 k [bps], a bandwidth of 12.5 k [Hz].

For example, the waveform software determining section of the server 71 determines that the frequency of 401.0 [MHz] satisfies the frequency condition by a method similar to that in the sixth exemplary embodiment, and if the further required transmission rate is 9.6 k [bps], determines the waveform software A, to be the waveform software that can provide the transmission rate equal to or above the necessary transmission rate. Then the waveform software determining section transmits the determined waveform software to the software defined radio devices 61, 62 through the waveform software transmitting section.

Note that if the data is not necessarily converted into digital, just as in the audio communication, it cannot be necessarily represented in the transmission rate. In such a case, the waveform software may be selected directly based on the service type and the bandwidth. More specifically, when realizing the audio communication in the analogue system, the carrier wave is modulated in the audio signal such as by FM (frequency modulation) and AM (amplitude modulation), and therefore it cannot be expressed in the transmission rate. In such a case, only the directly relevant bandwidth may be used to determine the audio quality.

Ninth Exemplary Embodiment

In the ninth exemplary embodiment, as a specific alternative example of the waveform software determining section 202 in the first to fifth exemplary embodiments described above, the dynamically changing parameter such as a remaining amount of the resources of the software defined radio devices 61, 62 is used to determine the waveform software. The entire configuration of the ninth exemplary embodiment is the system configuration illustrated in FIG. 14, just as the sixth exemplary embodiment, however is different from the sixth exemplary embodiment in the following functions of the software defined radio devices 61, 62 and the server 71.

FIG. 20A illustrates observation data transmitted to the server 71 from the observing section of the software defined radio device 61, and FIG. 20B illustrates observation data transmitted to the server 71 from the observing section of the software defined radio device 62. The observation data in FIG. 20A illustrates information related to the resource of the software defined radio device 61, and the observation data in FIG. 20B illustrates information related to the resource of the software defined radio device 62. In FIG. 20A and FIG. 20B, the information related to the resource is an index value of a CPU (central processing unit) (e.g., frequency or utilization), an index value of a DSP (digital signal processor) (e.g., frequency or utilization), a remaining amount of the memory, a remaining amount of the storage, a remaining amount of the battery, and an extra margin up to the limit value of the temperature of a specific part of the CPU, etc. However, the information related to the resource is not limited to them. By comparing the observation data in FIG. 20A and the observation data in FIG. 20B, overall, the observation data in FIG. 20B has a smaller remaining amount or extra margin of resource.

The waveform software determining section of the server 71 compares the remaining amounts or extra margins of the resources of the software defined radio devices 61, 62 planned to be mutually communicated, and determines waveform software by using, as a reference, the one among the software defined radio devices 61, 62 which has a smaller remaining amount or extra margin of the resource. The grounds therefor is that the waveform software operating within the range of smaller remaining amount or extra margin can be operated on the software defined radio device having a greater remaining amount or extra margin without trouble. Therefore, in the case of FIG. 20A and FIG. 20B, the waveform software operating within the range of remaining amount and extra margin of the software defined radio device 62 is determined to be able to be operated in either one of the software defined radio devices 61, 62. The determined reference of the resource remaining amount is the CPU index value of 60, the DSP index value of 10, the memory remaining amount of 8 MB, and the storage remaining amount of 16 MB.

The waveform software determining section of the server 71, after determining the reference of the remaining amount in the above manner, determines the waveform software based on that reference. In the present exemplary embodiment, the waveform software determining section of the server 71 includes a library storing therein waveform software. From the library, appropriate waveform software is selected.

FIG. 21 illustrates a configuration example of a library. The library in this example stores therein sets each included of waveform software and a resource requirement. As a resource requirement, index values required of the CPU and the DSP and the remaining amounts required of the memory and the storage are stored. For example, the waveform software A on the first line indicate that the CPU index value is 120, the DSP index value is 40, the memory remaining amount is 128 MB, and the storage remaining amount is 256 MB.

Based on the reference of the resource remaining amount stated above, the waveform software determining section of the server 71 selects, from the library of FIG. 21, the waveform software that satisfies the resource requirement, i.e., the CPU index value of 60 or below, the DSP index value of 10 or below, the memory remaining amount of 8 MB or below, and the storage remaining amount of 16 MB or below. Thus, the waveform software C is selected.

Note that, if there are a plurality of pieces of waveform software satisfying the resource requirement, the waveform software determining section of the server 71 makes a final decision on a single piece of waveform software, by considering the other requirements. For example, the waveform software determining section of the server 71 may select the waveform software describing the communication method having a narrower bandwidth, from among the plurality of pieces of waveform software. In addition, by considering the required bandwidth, the waveform software that can secure the required bandwidth may be selected. Furthermore, because the power consumption or the temperature increase is restrained in the waveform software having a lighter load in view of the battery remaining amount and the level of temperature extra margin, waveform software having a lighter load may be selected. Note that the waveform software may be dynamically generated just as in the sixth exemplary embodiment.

So far, the methods for determining waveform software appropriate for communication between software defined radio devices in the sixth to ninth exemplary embodiments have been described. However, it is also possible to decide waveform software appropriate for communication between software defined radio devices, by combining the sixth to ninth exemplary embodiments.

Tenth Exemplary Embodiment

Figure 22:
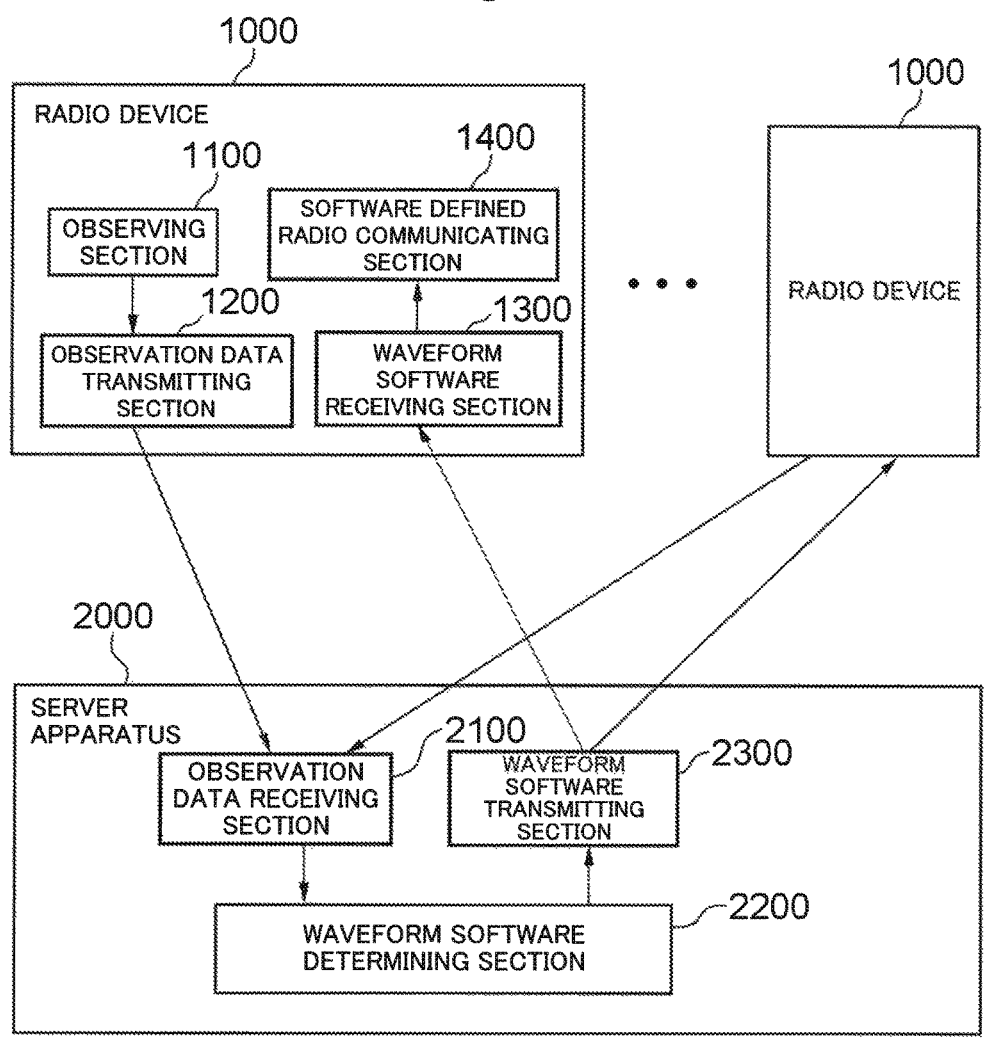
FIG. 22 is a block diagram illustrating a configuration example of a software defined radio device and a server according to the tenth exemplary embodiment of the present invention.

Referring to FIG. 22, the radio communication system according to the tenth exemplary embodiment of the present invention includes a plurality of radio devices 1000 and a server apparatus 2000.

Each radio device 1000 includes an observing section 1100, an observation data transmitting section 1200, a waveform software receiving section 1300, and a software defined radio communicating section 1400.

The observing section 1100 has a function of observing the dynamically changing state regarding itself. The observation data transmitting section 1200 has a function of transmitting the observation data, which is data representing the state observed by the observing section 1100, to the server apparatus 2000. The waveform software receiving section 1300 has a function of receiving the waveform software transmitted from the server apparatus 2000. The software defined radio communicating section 1400 has a function of realizing the communication by the communication method defined by that waveform software, by being controlled by the waveform software received by the waveform software receiving section 1300.

The server apparatus 2000 includes an observation data receiving section 2100, a waveform software determining section 2200, and a waveform software transmitting section 2300.

The observation data receiving section 2100 has a function of receiving the observation data transmitted from the radio device 1000. The waveform software determining section 2200 has a function of determining the waveform software to be used for communication between the plurality of radio devices 1000, based on the observation data received from the plurality of radio devices 1000. The waveform software transmitting section 2300 has a function of transmitting the waveform software determined by the waveform software determining section 2200 to the plurality of radio devices.

The radio communication system according to the present exemplary embodiment as configured above operates as in the following.

First, the observing section 1100 of each radio device 1000 observes the dynamically changing state regarding itself, and the observation data transmitting section 1200 transmits the observation data, which is data representing the observed state, to the server apparatus 2000.

Next, the observation data receiving section 2100 of the server apparatus 2000 receives the observation data transmitted from the radio device 1000. Next, the waveform software determining section 2200 of the server apparatus 2000 determines the waveform software to be used in the communication between the plurality of radio devices 1000 based on the observation data received from the plurality of radio devices 1000. Next, the waveform software transmitting section 2300 of the server apparatus 200 transmits, to the plurality of radio devices 1000, the waveform software determined as in the above.

Next, the waveform software receiving section 1300 of each radio device 1000 receives the waveform software transmitted from the server apparatus 2000. Next, by being controlled by this received waveform software, the software defined radio communicating section 1400 of each radio device 1000 performs communication with the other radio device 1000, by means of the communication method defined for this waveform software.

In this way, according to the present exemplary embodiment, the waveform software to be used in the communication between a plurality of radio devices is determined by considering the state of these plurality of radio devices. Therefore, the communication between the plurality of radio devices can be performed without trouble.

So far, the present invention has been explained by way of the exemplary embodiments. However, the technical scope of the present invention is not limited to the description of the exemplary embodiments stated above. As obvious to those skilled in the art, various changes or modifications can be made to the exemplary embodiments stated above. Therefore, it is needless to say that the embodiments to which such changes or modifications are made are also included in the technical scope of the present invention. In addition, the numerical values, the names of the configurations, and the like used in the exemplary embodiments stated above are exemplary, and can be changed where necessary.

A part or all of the exemplary embodiments stated above can also be stated as, but not limited to, the following Supplemental Notes.

(Supplemental Note 1)

A radio communication system including a plurality of radio devices and a server apparatus, where each of the radio devices includes:

an observing means for observing a dynamically changing state regarding itself;

an observation data transmitting means for transmitting, to the server apparatus, observation data which is data representing the observed state;

a waveform software receiving means for receiving the waveform software transmitted from the server apparatus; and a software defined radio communication means controlled by the received waveform software, and where the server apparatus includes:

an observation data receiving means for receiving the observation data transmitted from the radio device;

a waveform software determining means for determining the waveform software to be used in communication between the plurality of radio devices based on the observation data received from the plurality of radio devices; and a waveform software transmitting means for transmitting the determined waveform software to the plurality of radio devices.

(Supplemental Note 2)

The radio communication system according to Supplemental Note 1, where the observing means observes a radio wave environment as the state, and the waveform software determining means determines a frequency to be used in communication between the plurality of radio devices based on the observation data representing the radio wave environment, and determines the waveform software based on the determined frequency.

(Supplemental Note 3)

The radio communication system according to Supplemental Note 1, where the observing means observes a type of a service provided to a user, and the waveform software determining means determines a transmission rate to be used in communication between the plurality of radio devices based on the observation data representing the type of the service, and determines the waveform software based on the determined transmission rate.

(Supplemental Note 4)

The radio communication system according to Supplemental Note 1, where the observing means observes information related to a resource of the radio device, and the waveform software determining means determines the waveform software based on the observation data representing the information related to the resource.

(Supplemental Note 5)

The radio communication system according to any one of Supplemental Note 1 to Supplemental Note 4, where the server apparatus includes:

an observation data obtaining request transmitting means for transmitting an observation data obtaining request to the radio device, and the radio device includes:

an observation data obtaining request receiving means for receiving the observation data obtaining request; and an observation control means for controlling the observing means according to the received observation data obtaining request.

(Supplemental Note 6)

The radio communication system according to any one of Supplemental Note 1 to Supplemental Note 5, where the radio device includes:

a storage section for storing observation data transmitting waveform software, waveform software receiving waveform software, and the waveform software received from the server apparatus; and a radio control section for selectively causing to function the software defined radio communicating section, as a communication section between the observation data transmitting means, the waveform software receiving means, and another of the radio devices, by selectively loading the observation data transmitting waveform software, the waveform software receiving waveform software, and the waveform software received from the server apparatus to the software defined radio communicating section.

(Supplemental Note 7)

The radio communication system according to any one of Supplemental Note 1 to Supplemental Note 6, where the server apparatus includes:

a server-side software defined radio communicating section;

a storage section for storing observation data receiving waveform software and waveform software transmitting waveform software; and a server-side radio control section for selectively functioning the server-side software defined radio communicating section as the observation data receiving means and the waveform software transmitting means, by selectively loading the observation data receiving waveform software and the waveform software transmitting waveform software to the server-side software defined radio communicating section.

(Supplemental Note 8)

The radio communication system according to any one of Supplemental Note 1 to Supplemental Note 7, including, between the server apparatus and the plurality of radio devices;

a relay software defined radio device for transmitting the observation data received from the radio device to the server apparatus, and transmitting the waveform software transmitted from the server apparatus to the radio device.

(Supplemental Note 9)

A radio communication method performed by a radio communication system including a plurality of radio devices and a server apparatus, the radio communication method including:

each of the radio devices observing a dynamically changing state regarding itself, and transmitting, to the server apparatus, observation data which is data representing the observed state, the server apparatus receiving the observation data transmitted from the radio device, determining waveform software to be used in communication between the plurality of radio devices based on the observation data received from the plurality of radio devices, and transmitting the determined waveform software to the plurality of radio devices, and each of the radio devices receiving the waveform software transmitted from the server apparatus, and controlling a software defined radio communication means of itself by means of the received waveform software.

(Supplemental Note 10)

A server apparatus connected to a plurality of radio devices, the server apparatus including:

an observation data receiving means for receiving observation data which represents a dynamically changing state regarding the radio devices and transmitted from the radio devices;

a waveform software determining means for determining waveform software to be used in communication between the plurality of radio devices based on the observation data received from the plurality of radio devices; and a waveform software transmitting means for transmitting the determined waveform software to the plurality of radio devices.

(Supplemental Note 11)

A method executed by a server apparatus connected to a plurality of radio devices and including an observation data receiving means, a waveform software determining means, and a waveform software transmitting means, the method including:

the observation data receiving means receiving observation data representing a dynamically changing state regarding the radio device and transmitted from the radio device;

the waveform software determining means determining waveform software to be used in communication between the plurality of radio devices based on the observation data received from the plurality of radio devices; and the waveform software transmitting means transmitting the determined waveform software to the plurality of radio devices.

(Supplemental Note 12)

A program that causes a computer connected to a plurality of radio devices to function as:

an observation data receiving means for receiving observation data which represents a dynamically changing state regarding the radio devices and transmitted from the radio devices;

a waveform software determining means for determining waveform software to be used in communication between the plurality of radio devices based on the observation data received from the plurality of radio devices; and a waveform software transmitting means for transmitting the determined waveform software to the plurality of radio devices.

The present application claims the priority based on Japanese Patent Application No. 2014-211705 filed on Oct. 16, 2014, all the disclosure of which is incorporated herein.

INDUSTRIAL APPLICABILITY

The present invention is applicable to the radio communication networks in general, but plays a pronounced effect in a radio for business purpose which, unlike the radio communication networks of the communication carriers, includes a plurality of operated frequencies and radio communication methods, and in which each radio terminal does not necessarily communicate via a base station.

REFERENCE SIGNS LIST

11-1n, 61, 62 software defined radio device
2 server
3, 31, 32 network
60 base station
101 observing section
102 observation data transmitting section
103 waveform software receiving section
104 software defined radio communicating section
105 observation data obtaining request receiving section
106 observation control section
107 radio control section
108 memory
201 observation data receiving section
202 waveform software determining section
203 waveform software transmitting section
204 observation data obtaining request transmitting section
206 software defined radio communicating section
207 radio control section
1000 radio device
1092 observation data transmitting waveform storage section
1093 waveform software receiving waveform storage section
1095 observation data obtaining request receiving waveform storage section
1100 observing section
1200 observation data transmitting section
1300 waveform software receiving section
1400 software defined radio communicating section
2000 server apparatus
2081 observation data receiving waveform storage section
2084 waveform software transmitting waveform storage section
2085 observation data obtaining request transmitting waveform storage section
2100 observation data receiving section
2200 waveform software determining section
2300 waveform software transmitting section

What is claimed is:

1. A radio communication system comprising a plurality of radio devices and a server apparatus, wherein
each of the radio devices is configured to:
observe a dynamically changing state regarding itself;
transmit, to the server apparatus, observation data which is data representing the observed state, the observation data comprising a field intensity of a range of frequencies within a radio wave environment;
receive waveform software transmitted from the server apparatus, the radio device subsequently being controlled by the received waveform software, and
the server apparatus is configured to:
receive the observation data transmitted from the radio device;
determine that the observation data indicates that the field intensity of the range of frequencies is below a predetermined value and correspondingly conclude that the range of frequencies is unused;
determine the waveform software from a plurality of waveform software, each waveform software corresponding to a frequency and bandwidth to be used in communication between the plurality of radio devices, the determined waveform software corresponding to a narrowest bandwidth at a frequency within the range of frequencies; and transmit the determined waveform software to the plurality of radio devices, wherein each radio device observes a radio wave environment as the state, and the server apparatus determines a frequency to be used in communication between the plurality of radio devices based on the observation data representing the radio wave environment, and determines the waveform software based on the determined frequency.

2. The radio communication system according to claim 1, wherein each radio device observes a type of a service provided to a user, and the server apparatus determines a transmission rate to be used in communication between the plurality of radio devices based on the observation data representing the type of the service, and determines the waveform software based on the determined transmission rate.

3. The radio communication system according to claim 2, wherein the server apparatus is further configured to:
transmit an observation data obtaining request to the radio device, and the radio device is further configured to:
receive the observation data obtaining request; and
control observation of the dynamically changing state regarding itself according to the received observation data obtaining request.

4. The radio communication system according to claim 1, wherein each radio device observes information related to a resource of the radio device, and the server apparatus determines the waveform software based on the observation data representing the information related to the resource.

5. The radio communication system according to claim 2, wherein the radio device is further configured to:
store observation data transmitting waveform software, waveform software receiving waveform software, and the waveform software received from the server apparatus; and selectively load the observation data transmitting waveform software, the waveform software receiving waveform software, and the waveform software received from the server apparatus.

6. The radio communication system according to claim 4, wherein the server apparatus is further configured to:
transmit an observation data obtaining request to the radio device, and the radio device is further configured to:
receive the observation data obtaining request; and
control observation of the dynamically changing state regarding itself according to the received observation data obtaining request.

7. The radio communication system according to claim 4, wherein the radio device is further configured to:
store observation data transmitting waveform software, waveform software receiving waveform software, and the waveform software received from the server apparatus; and selectively load the observation data transmitting waveform software, the waveform software receiving waveform software, and the waveform software received from the server apparatus.

8. The radio communication system according to claim 1, wherein the server apparatus is further configured to:
transmit an observation data obtaining request to the radio device, and the radio device is further configured to:
receive the observation data obtaining request; and
control observation of the dynamically changing state regarding itself according to the received observation data obtaining request.

9. The radio communication system according to claim 8, wherein the radio device is further configured to:
store observation data transmitting waveform software, waveform software receiving waveform software, and the waveform software received from the server apparatus; and selectively load the observation data transmitting waveform software, the waveform software receiving waveform software, and the waveform software received from the server apparatus.

10. The radio communication system according to claim 1, comprising, between the server apparatus and the plurality of radio devices;

a relay software defined radio device configured to transmit the observation data received from the radio device to the server apparatus, and transmit the waveform software transmitted from the server apparatus to the radio device.

11. A radio communication method performed by a radio communication system including a plurality of radio devices and a server apparatus, the radio communication method comprising:

by each of the radio devices:
observing a dynamically changing state regarding itself;
transmitting, to the server apparatus, observation data which is data representing the observed state, the observation data comprising a field intensity of a range of frequencies within a radio wave environment;
receiving waveform software transmitted from the server apparatus, the radio device subsequently being controlled by the received waveform software, and by the server apparatus:
receiving the observation data transmitted from the radio device;
determining that the observation data indicates that the field intensity of the range of frequencies is below a predetermined value and correspondingly conclude that the range of frequencies is unused;
determining the waveform software from a plurality of waveform software, each waveform software corresponding to a frequency and bandwidth to be used in communication between the plurality of radio devices, the determined waveform software corresponding to a narrowest bandwidth at a frequency within the range of frequencies; and
transmitting the determined waveform software to the plurality of radio devices, wherein each radio device observes a radio wave environment as the state, and the server apparatus determines a frequency to be used in communication between the plurality of radio devices based on the observation data representing the radio wave environment, and determines the waveform software based on the determined frequency.

* * * * *